United States Patent
Bahuleyan et al.

(10) Patent No.: US 11,893,348 B2
(45) Date of Patent: Feb. 6, 2024

(54) TRAINING A MACHINE LEARNING SYSTEM FOR KEYWORD PREDICTION WITH NEURAL LIKELIHOOD

(71) Applicant: ROYAL BANK OF CANADA, Toronto (CA)

(72) Inventors: Hareesh Pallikara Bahuleyan, Montreal (CA); Layla El Asri, Montreal (CA)

(73) Assignee: ROYAL BANK OF CANADA, Toronto (CA)

( * ) Notice: Subject to any disclaimer, the term of this patent is extended or adjusted under 35 U.S.C. 154(b) by 283 days.

(21) Appl. No.: 17/364,006

(22) Filed: Jun. 30, 2021

(65) Prior Publication Data
US 2022/0004712 A1  Jan. 6, 2022

Related U.S. Application Data

(60) Provisional application No. 63/046,174, filed on Jun. 30, 2020.

(51) Int. Cl.
*G06F 40/279* (2020.01)
*G06F 40/289* (2020.01)
(Continued)

(52) U.S. Cl.
CPC .......... *G06F 40/284* (2020.01); *G06N 3/08* (2013.01)

(58) Field of Classification Search
CPC .... G06F 40/274; G06F 40/279; G06F 40/284; G06F 40/295; G06F 40/30; G06F 40/289;
(Continued)

(56) References Cited

U.S. PATENT DOCUMENTS

2010/0145678 A1\* 6/2010 Csomai ................. G06F 40/268
704/10
2016/0180246 A1\* 6/2016 Vickrey ................. G06N 20/00
706/12
(Continued)

FOREIGN PATENT DOCUMENTS

CA  3123792 A1 \* 12/2021  .......... G06F 40/284
CA  3146673 A1 \*  7/2022  .......... G06F 40/205

OTHER PUBLICATIONS

Bahuleyan et al., "Diverse Keyphrase Generation with Neural Unlikelihood Training", Proceedings of the 28th International Conference on Computational Linguistics, pp. 5271-5287, Dec. 8-13, 2020. (Year: 2020).\*

(Continued)

*Primary Examiner* — Martin Lerner
(74) *Attorney, Agent, or Firm* — Norton Rose Fulbright Canada LLP

(57) ABSTRACT

Computer implemented methods and systems are provided for generating diverse key phrases while maintaining competitive output quality. A system for training a sequence to sequence (S2S) machine learning model is proposed where neural unlikelihood objective approaches are used at (1) a target token level to discourage the generation of repeating tokens, and (2) a copy token level to avoid copying repetitive tokens from the source text. K-step ahead token prediction approaches are also proposed as an additional mechanism to augment the approach to further enhance the overall diversity of key phrase outputs.

20 Claims, 6 Drawing Sheets

(51) Int. Cl.
  *G06N 3/0455* (2023.01)
  *G06N 3/0475* (2023.01)
  *G06F 40/284* (2020.01)
  *G06N 3/08* (2023.01)

(58) Field of Classification Search
  CPC ........ G06N 3/08; G06N 3/092; G06N 3/0455; G06N 3/0475
  USPC .......................... 704/1, 9, 10; 706/12, 21, 25
  See application file for complete search history.

(56) References Cited

U.S. PATENT DOCUMENTS

| | | | | |
|---|---|---|---|---|
| 2017/0139899 | A1* | 5/2017 | Zhao | G06F 40/284 |
| 2019/0362257 | A1* | 11/2019 | Luo | G06N 20/00 |
| 2021/0182479 | A1* | 6/2021 | Kim | G06F 40/289 |
| 2021/0209356 | A1* | 7/2021 | Wang | G06F 40/279 |

OTHER PUBLICATIONS

Dzmitry Bahdanau, Kyunghyun Cho, and Yoshua Bengio. 2015. Neural machine translation by jointly learning to align and translate. In Yoshua Bengio and Yann LeCun, editors, 3rd International Conference on Learning Representations, ICLR 2015, San Diego, CA, USA, May 7-9, 2015, Conference Track Proceedings.

Hareesh Bahuleyan, Lili Mou, Olga Vechtomova, and Pascal Poupart. 2018. Variational attention for sequence-to-sequence models. In Proceedings of the 27th International Conference on Computational Linguistics, pp. 1672-1682, Santa Fe, New Mexico, USA, August. Association for Computational Linguistics.

Kamil Bennani-Smires, Claudiu Musat, Andreea Hossmann, Michael Baeriswyl, and Martin Jaggi. 2018. Simple unsupervised key phrase extraction using sentence embeddings. In Proceedings of the 22nd Conference on Computational Natural Language Learning, pp. 221-229, Brussels, Belgium, October. Association for Computational Linguistics.

Adrien Bougouin, Florian Boudin, and Beatrice Daille. 2013. Topicrank: Graph-based topic ranking for keyphrase extraction. In International Joint Conference on Natural Language Processing (IJCNLP), pp. 543-551.

Hou Pong Chan, Wang Chen, Lu Wang, and Irwin King. 2019. Neural keyphrase generation via reinforcement learning with adaptive rewards. In Proceedings of the 57th Annual Meeting of the Association for Computational Linguistics, pp. 2163-2174, Florence, Italy, July. Association for Computational Linguistics.

Angela Fan, Mike Lewis, and Yann Dauphin. 2018. Hierarchical neural story generation. In Proceedings of the 56th Annual Meeting of the Association for Computational Linguistics (vol. 1: Long Papers), pp. 889-898, Melbourne, Australia, July. Association for Computational Linguistics.

Ygor Gallina, Florian Boudin, and Beatrice Daille. 2019. KPTimes: A large-scale dataset for keyphrase generation on news documents. In Proceedings of the 12th International Conference on Natural Language Generation, pp. 130-135, Tokyo, Japan, October-November. Association for Computational Linguistics.

Xiang Gao, Sungjin Lee, Yizhe Zhang, Chris Brockett, Michel Galley, Jianfeng Gao, and Bill Dolan. 2019. Jointly optimizing diversity and relevance in neural response generation. In Proceedings of the 2019 Conference of the North American Chapter of the Association for Computational Linguistics: Human Language Technologies, vol. 1 (Long and Short Papers), pp. 1229-1238, Minneapolis, Minnesota, June. Association for Computational Linguistics.

Jiatao Gu, Zhengdong Lu, Hang Li, and Victor O.K. Li. 2016. Incorporating copying mechanism in sequence-to-sequence learning. In Proceedings of the 54th Annual Meeting of the Association for Computational Linguistics (vol. 1: Long Papers), pp. 1631-1640, Berlin, Germany, August. Association for Computational Linguistics.

Khaled M Hammouda, Diego N Matute, and Mohamed S Kamel. 2005. Corephrase: Keyphrase extraction for document clustering. In International workshop on machine learning and data mining in pattern recognition, pp. 265-274. Springer.

Sepp Hochreiter and Jürgen Schmidhuber. 1997. Long short-term memory. Neural computation, 9(8):1735-1780.

Ari Holtzman, Jan Buys, Li Du, Maxwell Forbes, and Yejin Choi. 2020. The curious case of neural text degeneration. In 8th International Conference on Learning Representations, ICLR 2020, Addis Ababa, Ethiopia, Apr. 26-30, 2020. OpenReview.net.

Shaojie Jiang, Thomas Wolf, Christof Monz, and Maarten de Rijke. 2020. TLDR: token loss dynamic reweighting for reducing repetitive utterance generation. CoRR, abs/2003.11963.

Feifan Liu, Deana Pennell, Fei Liu, and Yang Liu. 2009. Unsupervised approaches for automatic keyword extraction using meeting transcripts. In Proceedings of Human Language Technologies: The 2009 Annual Conference of the North American Chapter of the Association for Computational Linguistics, pp. 620-628, Boulder, Colorado, June. Association for Computational Linguistics.

Jiwei Li, Michel Galley, Chris Brockett, Jianfeng Gao, and Bill Dolan. 2016. A diversity-promoting objective function for neural conversation models. In Proceedings of the 2016 Conference of the North American Chapter of the Association for Computational Linguistics: Human Language Technologies, pp. 110-119, San Diego, California, June. Association for Computational Linguistics.

Rui Meng, Sanqiang Zhao, Shuguang Han, Daqing He, Peter Brusilovsky, and Yu Chi. 2017. Deep keyphrase generation. In Proceedings of the 55th Annual Meeting of the Association for Computational Linguistics (vol. 1: Long Papers), pp. 582-592, Vancouver, Canada, July. Association for Computational Linguistics.

Rada Mihalcea and Paul Tarau. 2004. TextRank: Bringing order into text. In Proceedings of the 2004 Conference on Empirical Methods in Natural Language Processing, pp. 404-411, Barcelona, Spain, July. Association for Computational Linguistics.

Thuy Dung Nguyen and Min-Yen Kan. 2007. Keyphrase extraction in scientific publications. In International conference on Asian digital libraries, pp. 317-326. Springer.

Tong Niu and Mohit Bansal. 2020. Avgout: A simple output-probability measure to eliminate dull responses. In The Thirty-Fourth AAAI Conference on Artificial Intelligence, AAAI 2020, The Thirty-Second Innovative Applications of Artificial Intelligence Conference, IAAI 2020, The Tenth AAAI Symposium on Educational Advances in Artificial Intelligence, EAAI 2020, New York, NY, USA, Feb. 7-12, 2020, pp. 8560-8567. AAAI Press.

Matteo Pagliardini, Prakhar Gupta, and Martin Jaggi. 2018. Unsupervised learning of sentence embeddings using compositional n-gram features. In Proceedings of the 2018 Conference of the North American Chapter of the Association for Computational Linguistics: Human Language Technologies, vol. 1 (Long Papers), pp. 528-540, New Orleans, Louisiana, June. Association for Computational Linguistics.

Kishore Papineni, Salim Roukos, Todd Ward, and Wei-Jing Zhu. 2002. Bleu: a method for automatic evaluation of machine translation. In Proceedings of the 40th annual meeting on association for computational linguistics, pp. 311-318. Association for Computational Linguistics.

Ilya Sutskever, Oriol Vinyals, and Quoc V Le. 2014. Sequence to sequence learning with neural networks. In Advances in neural information processing systems, pp. 3104-3112.

Ashwin K. Vijayakumar, Michael Cogswell, Ramprasaath R. Selvaraju, Qing Sun, Stefan Lee, David J. Crandall, and Dhruv Batra. 2018. Diverse beam search for improved description of complex scenes. In Sheila A. McIlraith and Kilian Q. Weinberger, editors, Proceedings of the Thirty-Second AAAI Conference on Artificial Intelligence, (AAAI—18), the 30th innovative Applications of Artificial Intelligence (IAAI—18), and the 8th AAAI Symposium on Educational Advances in Artificial Intelligence (EAAI—18), New Orleans, Louisiana, USA, Feb. 2-7, 2018, pp. 7371-7379. AAAI Press.

Sean Welleck, Ilia Kulikov, Stephen Roller, Emily Dinan, Kyunghyun Cho, and Jason Weston. 2020. Neural text generation with unlikelihood training. In International Conference on Learning Representations.

(56) References Cited

OTHER PUBLICATIONS

Hai Ye and Lu Wang. 2018. Semi-supervised learning for neural keyphrase generation. In Proceedings of the 2018 Conference on Empirical Methods inNatural Language Processing, pp. 4142-4153, Brussels, Belgium, October-November. Association for Computational Linguistics.

Xingdi Yuan, Tong Wang, Rui Meng, Khushboo Thaker, Peter Brusilovsky, Daqing He, and Adam Trischler. 2020. One size does not fit all: Generating and evaluating variable number of keyphrases. In Proceedings of the 58th Annual Meeting of the Association for Computational Linguistics, Seattle, USA. Association for Computational Linguistics.

Yaoming Zhu, Sidi Lu, Lei Zheng, Jiaxian Guo, Weinan Zhang, Jun Wang, and Yong Yu. 2018. Texygen: A benchmarking platform for text generation models. In The 41st International ACM SIGIR Conference on Research & Development in Information Retrieval, pp. 1097-1100.

* cited by examiner

TRAINING A MACHINE LEARNING SYSTEM FOR KEYWORD PREDICTION WITH NEURAL LIKELIHOOD

CROSS REFERENCE TO RELATED APPLICATIONS

This application is a non-provisional of, and claims all benefit, including priority to: U.S. Application No. 63/046,174, filed 2020 Jun. 30, entitled SYSTEMS AND METHODS FOR DIVERSE KEYPHRASE GENERATION WITH NEURAL UNLIKELIHOOD TRAINING, incorporated herein by reference in its entirety.

FIELD

Embodiments of the present disclosure generally relate to the field of keyphrase generation, and more specifically, embodiments relate to devices, systems and methods for keyphrase generation for diverse tokens.

INTRODUCTION

Key phrases (KPs) were automatically extracted from source documents by retrieving and ranking a set of candidate phrases through rule based approaches. The rules are often static rules, and yielded undesirable outputs as the KPs generated had a high level of redundancy or a lack of diversity. These KPs could be redundant or poorly representative of the source material, requiring further manual approaches for updating the automatically extracted KPs to improve their relevancy.

Some approaches generated KPs one at a time, or generate a large number of KPs, and subsequently de-duplicate the generated KPs to mimic diverse KP generation. The process of generating the KPs and subsequently removing duplicates can involve the use of extensive computational resources for KPs which are duplicates. For example, generating KPs which are subsequently removed for duplication can involve exhaustive beam search decoding to over-generate KPs and then application of post-processing to remove repetitions.

SUMMARY

Devices, systems and methods which can automatically generate diverse token KPs in a computationally efficient manner, or without the need for post processing, are desirable, and a number of computational approaches are described herein illustrating technical approaches and architectures for automatic KP extraction that yield improved diversity in outputs in certain situations.

A key phrase generation system is described herein that generates key phrases which include a greater variety of phrases, which may make interpreting the generated key phrases more intuitive, or convey a larger amount of information, or convey information more efficiently. Automated key phrase generation yields a number of technical problems relating to machine learning. As noted herein, different approaches can yield different generated key phrase outputs. A technical problem being addressed by proposed technical approaches herein relate to automated generation of key phrases having improved diversity while maintaining competitive output quality.

The automated key phrase generation system of some embodiments is a computer system that receives input corpuses (e.g., text/string data objects representing a large amount of block of words, such as a book, an instruction manual, an abstract, a financial report, a scientific paper), and generates proposed key phrase output data sets (e.g., character/text/string data objects). These proposed key phrase output data sets represent key phrases generated based on the input corpuses (e.g., "interoperability infrastructures").

The proposed key phrase output data sets can be used for automatically generating summaries, for data compression (e.g., caching/storing only the key phrases instead of the whole corpus on more expensive, easy to access data storage and archiving the rest), for generating index/tag information (useful where a large amount of documents are being automatically indexed for quick navigation or searching), among others.

Accordingly, the system can be adapted for interoperability with other upstream and downstream computing systems that respectively provide input corpuses as an input data stream and receive key phrases as an output data stream.

Improved key phrases are useful as the selection of key phrases has specific technical impacts on the computational efficiency of the downstream computing systems (e.g., improving the speed of indexing, reducing the amount of memory required to store the key phrases, reducing an overall index size (important for large indices)). In particular, for indexing, the overall speed optimization, query performance (time and processing power), scalability, is directly impacted by the quality of automatically generated key phrases.

The generation of improved key phrases is a non-trivial technical problem. The inventors implemented, developed and tested a number of variant embodiments to provide technical performance results compared against five S2S key phrase generation baselines, described in further detail herein showing improved technical performance with a satisfactory level of technical trade-offs. A summary of these results along with example implementation details are provided further below. Other variations of implementation are possible and the described approaches are not meant to be limiting.

Technical challenges associated with key phrase generation include the difficulty of generating non-repetitive key phrases where source materials include a plurality of repeated source tokens (e.g., key phrases). If the key phrase generator learns to generate key phrases based on the source material, the key phrase generator is likely to adopt the repetition present in the source material. A further technical challenge associated with key phrase generation includes the difficulty of generating unique or diverse key phrases without the need to remove repetitive key phrases in post processing. Most key phrase generators try to determine the most correct or accurate key phrase, and incorporating the secondary consideration of key phrase diversity can adversely affect the primary goal of generating accurate key phrases. As a result, existing approaches rely upon removing duplicate key phrases in post-processing to preserve accuracy.

Another technical challenge is that in order to remove a post processing process which de-duplicates the generated key phrases, the key phrase generator needs to incorporate key phrase diversity into the machine learning model. Incorporating key phrase diversity may adversely impact accuracy, or require increased computing resource requirements in order to enforce diversity.

The proposed key phrase generation system tackles the issue of key phrase generation diversity at the training stage of training a sequence to sequence (S2S) machine learning model.

The proposed system is configured to penalize the decoder for generating tokens which have already been predicted by the key phrase generator by introducing a loss term based on comparing the predicted key phrase with previously seen phrases in the label and the training data as correct key phrases. The proposed system also penalizes the decoder for generating tokens which have already been seen in the source materials (collectively referred to as adopting "the unlikelihood training objective").

By adopting the unlikelihood training objective, the proposed key phrase generation system may be able to avoid mimicking repetition in the source materials. Similarly, the proposed key phrase generation system may remove the amount of redundancy and generated key phrases to obviate the need for post processing. Finally, key phrase generation system may be able to overcome the technical challenges with limited additional computational resources required.

In an aspect, a system for training a sequence to sequence (S2S) machine learning model for predicting keywords is disclosed. The system includes at least one computer memory having stored thereon the S2S machine learning model, the S2S machine learning model comprising a plurality of parameters representative of a decoder, the decoder including a generation data model architecture and a copy data model architecture, and at least one processor, in communication with the at least one computer memory.

The processor is configured to receive a first data set comprising a plurality of source token sets, and related ground truth token sets, and extract a second data set of target vocabulary tokens from the first data set comprising a subset of source tokens and ground truth tokens of the first data set. The processor is also configured to train the S2S machine learning model for predicting keywords by, for each source token in a first source token set, generating a predicted keyword based on a first source token set keyword probability distribution of the copy mechanism associated with a probability of generating the keyword from the first source token set, based on the respective token, and a second set keyword probability distribution of the generation data model architecture, based on the respective token, and associated with the probability of generating the keyword from the second data set. The computer processor also updates the plurality of parameters by determining a generation loss based on comparing the predicted keyword to a first exclusion list of ground truth tokens, determining a copy loss based on comparing the predicted keyword to a second exclusion list of source tokens and ground truth tokens, and adjusting the plurality of parameters based on the copy loss, the generation loss, and a comparison of the predicted keyword and a respective predicted keyword ground truth token to penalize the decoder for generating repetitive keywords, and store the trained S2S machine learning model for predicting keywords in the at least one computer memory. The processor also stores the trained S2S machine learning model in the at least one computer memory.

In example embodiments, the processor is further configured to generate a plurality of sequential predicted keywords based on the first source token set keyword probability distribution of the copy mechanism associated with a probability of generating the keyword from the first source token set, based on a respective plurality of sequential source tokens of the first data set, and a second set keyword probability distribution of the generation data model architecture, based on the respective plurality of sequential source tokens of the first data set, and associated with the probability of generating the keyword from the second data set.

The processor also updates the plurality of parameters by, sequentially, for each ground truth token associated with the respective plurality of sequential source tokens of the first data set, determining a generation loss based on comparing the respective ground truth token to the first exclusion list of ground truth tokens, determining a copy loss based on comparing the predicted keyword to a second exclusion list of source tokens and ground truth tokens, and adjusting the plurality of parameters based on the copy loss, the generation loss, and a comparison of the predicted keyword and a respective predicted keyword ground truth token to penalize the decoder for generating repetitive keywords.

In example embodiments, the sequential copy losses, generation losses, and comparisons of the predicted keyword and the respective predicted keyword ground truth token losses are reduced by a decay rate.)

In example embodiments, the first exclusion list comprises one or more ground truth tokens and one or more source tokens associated with the one or more ground truth tokens and the one or more source tokens previously processed by the decoder.

In example embodiments, the first exclusion list is dynamically updated to include each ground truth token and source token processed by the decoder.

In example embodiments, the second exclusion list comprises one or more source tokens associated with the one or more source tokens previously processed by the decoder.

In example embodiments, the second exclusion list is dynamically updated to include each source token processed by the decoder.

According to a further aspect, a method for training a sequence to sequence (S2S) machine learning model for predicting keywords is disclosed. The method includes receiving a first data set comprising a plurality of source token sets, and related ground truth token sets and extracting a second data set of target vocabulary tokens from the first data set comprising a subset of source tokens and ground truth tokens of the first data set. The method also includes training the S2S machine learning model by, for each source token in a first source token set, generating a predicted keyword based on a first source token set keyword probability distribution of the copy mechanism associated with a probability of generating the keyword from the first source token set, based on the respective token, and a second set keyword probability distribution of the generation data model architecture, based on the respective token, and associated with the probability of generating the keyword from the second data set. The method also includes updating the plurality of parameters by determining a generation loss based on comparing the predicted keyword to a first exclusion list of ground truth tokens, determining a copy loss based on comparing the predicted keyword to a second exclusion list of source tokens and ground truth tokens, adjusting the plurality of parameters based on the copy loss, the generation loss, and a comparison of the predicted keyword and a respective predicted keyword ground truth token to penalize the decoder for generating repetitive keywords, and store the trained S2S machine learning model for predicting keywords in the at least one computer memory, and storing the trained S2S machine learning model.

In example embodiments, the method further comprising generating a plurality of sequential predicted keywords based on the first source token set keyword probability distribution of the copy mechanism associated with a probability of generating the keyword from the first source token set, based on a respective plurality of sequential source tokens of the first data set, and a second set keyword probability distribution of the generation data model architecture, based on the respective plurality of sequential source tokens of the first data set, and associated with the probability of generating the keyword from the second data set. The method also includes updating the plurality of parameters by, sequentially, for each ground truth token associated with the respective plurality of sequential source tokens of the first data set, determining a generation loss based on comparing the respective ground truth token to the first exclusion list of ground truth tokens, determining a copy loss based on comparing the predicted keyword to a second exclusion list of source tokens and ground truth tokens, and adjusting the plurality of parameters based on the copy loss, the generation loss, and a comparison of the predicted keyword and a respective predicted keyword ground truth token to penalize the decoder for generating repetitive keywords.

example embodiments, the sequential copy losses, generation losses, and comparisons of the predicted keyword and the respective predicted keyword ground truth token losses are reduced by a decay rate.

In example embodiments, the first exclusion list comprises one or more ground truth tokens and one or more source tokens associated with the one or more ground truth tokens and the one or more source tokens previously processed by the decoder.

In example embodiments, the first exclusion list is dynamically updated to include each ground truth token and source token processed by the decoder.

In example embodiments, the second exclusion list comprises one or more source tokens associated with the one or more source tokens previously processed by the decoder.

In example embodiments, the second exclusion list is dynamically updated to include each source token processed by the decoder.

According to another aspect, a method for training a sequence to sequence (S2S) machine learning model for predicting keywords is disclosed. The method includes receiving a first data set comprising a plurality of source token sets, and related ground truth token sets, and retrieving a second data set of target vocabulary tokens. The method also includes training the S2S machine learning model by, for each source token in a first source token set, and generating a predicted keyword based on a first source token set keyword probability distribution of the copy mechanism associated with a probability of generating the keyword from the first source token set, based on the respective token, and a second set keyword probability distribution of the generation data model architecture, based on the respective token, and associated with the probability of generating the keyword from the second data set. According to the method, the plurality of parameters are updated by determining a generation loss based on comparing the predicted keyword to a first exclusion list of ground truth tokens, determining a copy loss based on comparing the predicted keyword to a second exclusion list of source tokens and ground truth tokens, and adjusting the plurality of parameters based on the copy loss, the generation loss, and a comparison of the predicted keyword and a respective predicted keyword ground truth token to penalize the decoder for generating repetitive keywords, and store the trained S2S machine learning model for predicting keywords in the at least one computer memory. The method also includes storing the trained S2S machine learning model.

In some embodiments, the system is provided as a special purpose computing machine or appliance, for example, provided in or coupled to a data center as a computing device coupled to a messaging bus to receive input data sets and to communicate output data sets with upstream and downstream computing systems, respectively. The special purpose computing machine, in an embodiment, can be a rack-mounted appliance that is slotted to fit on a server rack that is configured for efficient generation of key phrases. Other embodiments are possible.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
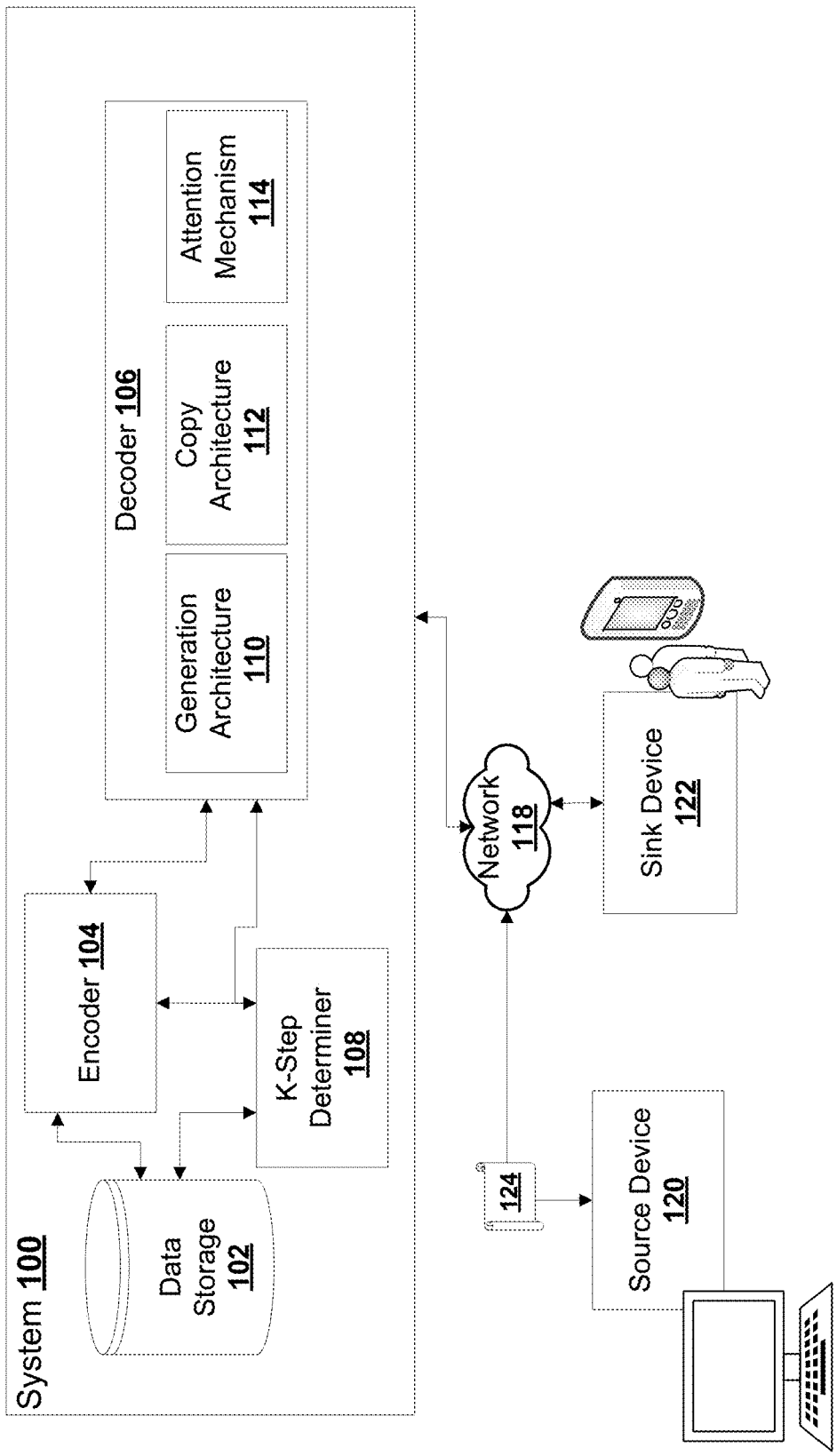
FIG. 1 is a block schematic diagram of an example system for diverse keyword generation, according to some embodiments.

Automatic key phrase generation includes generating single or multi-word lexical units that provides readers with high level information about the key ideas or important topics described in a given source text.

With recent advances in neural natural language generation and availability of larger training corpora, this problem is formulated under a sequence-to-sequence (S2S) modelling framework. S2S modelling framework has an advantage in that it can generate new and meaningful key phrases which may not be present in the source text. The earliest work in this direction was by meng-deep-kp, who trained a S2S model to generate one key phrase at a time.

A technical challenge associated with the previous approaches is that, in order to generate the single key phrases, the decoding required a beam size as high as 200, which is computationally expensive. Similarly, where the alternative approach of training a S2S model to generate multiple key phrases in a sequential manner, where the output KPs are separated by a pre-defined delimiter token is used, the approach can still require the use of exhaustive beam search decoding to over-generate KPs and the application post-processing tricks to remove repetitions.

At inference time, some approaches call for decoding with beam sizes as high as 200, to generate a large number of KPs and finally de-duplicate the outputs. However, this is computationally expensive and extremely wasteful because only <5% of such KPs were found to be unique.

An alternative approach is to train a S2S model to generate multiple key phrases in a sequential manner, where the output KPs are separated by a pre-defined delimiter token. This method has an added benefit that the model learns to generate a variable number of key phrases depending on the input, rather than the user having to specify the selection of top-k key phrases. However, some previous approaches still use exhaustive beam search decoding to over-generate KPs and then apply post-processing tricks to remove repetitions. Apart from the additional computational requirements, the inventors note that this method of avoiding information redundancy is sub-optimal.

Apart from an information summarization perspective, this task has applications in various downstream natural language processing tasks such as text classification, document clustering and information retrieval.

The inventors take a principled approach towards addressing the information redundancy issue in key phrase generation models through proposing a computational architecture and corresponding approach for improving diversity through changes in technical implementation.

The inventors propose to tackle this problem directly during the training stage, rather than applying ad-hoc post-processing at inference time. Specifically, the inventors adopt the unlikelihood training (UL) objective, whereby the decoder is penalized for generating undesirable tokens, which corresponds to the set of repeating tokens. welleck-ul introduce unlikelihood (UL) training for a language model setting. Since the inventors work with a S2S setup, the proposed version of UL loss includes two components: (1) a target token level UL loss (alternatively referred to as a generator loss) based on the target vocabulary, to penalize the model for generating repeating tokens; (2) a copy token level UL loss (alternatively referred to as a copy loss) based on the dynamic vocabulary of source tokens required for copy mechanism, which penalizes the model for copying repetitive tokens.

S2S models trained with maximum likelihood estimation (MLE) are usually tasked with the next token prediction objective. However, this does not necessarily incentivize the model to plan for future token prediction ahead of time. The inventors observe such lack of model planning capability through initial experiments with MLE models and to overcome this issue.

As a result, the inventors propose to configure the system to use K-step ahead token prediction, in a variant embodiment. This modified training objective encourages the model to learn to correctly predict not just the current token, but also tokens up to K-steps ahead in the future (alternatively referred to as future predicted keywords). The system can then incorporate UL training on the K-step ahead token prediction task.

The inventors' approach may address corpus level diversity. For example, a dialogue system may be trained with utterance (input) and reply (output) pairs. Since some replies such as "I don't know" or "thank you" might be frequently found in a training corpus, the model might pick up such a biased signal. At test time, the model might output "I don't know" more often than desired. For example, answering "I don't know" to "What is your name" or "Where are you from" is not a wrong answer. However, in this instance, the dialogue system becomes uninteresting and thus there is a need to improve diversity.

The inventors' approach may address individual output diversity. In comparison, the inventors' proposed system may not face the diversity issue in models from biased training. The diversity issue is concerned with the model generating the same key phrases over and over again for a given input.

Lack of Diversity Issue

The inventors conduct a pilot study using KP20 k dataset, a corpus of scientific articles. Each article consists of a title, an abstract and a set of associated key phrases. Table 1 shows one such example, along with outputs from two systems—a S2S model trained purely with MLE objective and the proposed model which is trained with a combination of unlikelihood training and future token prediction. It can be observed that with MLE objective alone, the S2S model tends to over-generate the same key phrase over and over again. On the other hand, the generated key phrases from the proposed model (shown as DivKGen) summarizes the abstract of the scientific article, without any repetitions.

TABLE 1

Comparison of sample outputs generated by the model (DivKGen) vs. an MLE baseline

| | |
|---|---|
| Title | semi-automated schema integration with sasmint |
| Abstract | the emergence of increasing number of collaborating organizations has made clear the need for supporting interoperability infrastructures, enabling sharing and exchange of data among organizations. schema matching and schema integration are the crucial components of the interoperability infrastructures, and their semi automation to interrelate or integrate heterogeneous and autonomous databases in collaborative networks is desired. the semi-automatic schema matching and integration sasmint system introduced in this paper identifies and resolves ( . . . ) |
| Ground Truth | schema integration; collaboration; schema matching; heterogeneity; data sharing |
| MLE Baseline | schema integration; sasmint; schema matching; schema integration; schema matching; sasmint derivation markup language |
| DivKGen | schema integration; interoperability infrastructures; schema matching; sasmint |

Furthermore, the inventors quantify this lack of diversity issue based on two simple metrics in Table 2—the percentage of duplicate key phrases and the percentage of duplicate tokens. On average, for an MLE model, about 27% of the generated KPs and 36% of the generated tokens are duplicates. These values are much higher than the percentage of repetitions present in the ground truth data. This implies that a significant computational effort is spent in the generation of redundant information. Moreover, additional post-processing pipelines are required in order to get rid of these repetitions. From a user experience point of view, the developed system should generate high quality key phrases that describe the main ideas in the source text, without any information redundancy.

| | #Key phrases | % duplicate key phrases | % duplicate tokens |
|---|---|---|---|
| Ground Truth | 5.3 | 0.1 | 7.3 |
| MLE Baseline | 7.3 | 26.6 | 36.0 |

Above: Table 2 A pilot study on KP20 k dataset validates the hypothesis about MLE-based training, which tends to generate a large number of repetitions in its outputs. The reported numbers are obtained by averaging the metrics across the test set.

FIG. 1 is block schematic diagram of an example system 100 for diverse keyword generation, in accordance with an embodiment.

The system 100 may be configured to communicate with a source device 120 and an external sink device 122 over a network 118. The system 100 can include a server or a physical computing device that resides in or at a data center.

The system 100, in some embodiments, can be configured as a server capable of various functions, and receives data sets, for example on a coupled message bus or messaging middleware from an upstream device (e.g., a data repository of source document string data objects, such as a newsfeed), processes the source document to generate keywords or key phrases, which are then provided through the message bus or messaging middleware for consumption by a downstream device (e.g., an auto-summarizer, a document classification engine, a document categorization engine, a document scoring engine, a natural language processing engine).

The components of system 100 may be provided through one or more processors coupled to computer memory and data storage, and in some embodiments, can be provided in the form of virtual machines or other types of distributed resources implementations where computing resources can be dynamically assigned.)

In another embodiment, the system 100 is instead provided as a standalone computing appliance that is configured as a special purpose machine which can be provided as a single computing unit that can be provided in, for example, a rack mounted configuration as a rack server that can be coupled to the message bus that is specially configured, for example, with machine learning optimized hardware (e.g., specialized graphics processing units) and adapted to efficiently generate keywords or key phrases from inputs.

The system 100 may receive a first data set 124 (e.g., a plurality of source token sets and related ground truth token sets, such as articles and per article associated labelled keywords). In some embodiments, the system 100 receives the first data set 124 from an external source device 120. In some variants, the source device 120 is internal to the system 100 (e.g., a database 102 within the system 100).

The system 100 generates a predicted key phrase data set which is transmitted to the sink device 112. In some embodiments, the sink device 122 is integrated within, or is internal to, system 100 (such as the database 102 in system 100).

Variations wherein the sink device 122 or the source device 120 are in some combination of external and internal to system 100 are contemplated.

The system 100 generates the predicted key phrase data set in response to processing received data sets (e.g., first data sets 124), which may include a plurality of source token sets (e.g., articles) and related ground truth token sets. The system 100 may be configured to generate a set of key phrases $y=\{y^1, y^2, y^{|y|}\}$ that best describe the input first data set. Each target key phrase $y^i=(y_1, y_2, \ldots, y_{T^i})$ is also a word sequence of length $T^i$.

The first data set 124 may need to be preprocessed into (x,y) pairs and that can conveniently be used in a sequence-to-sequence (S2S) modelling architecture to learn the mapping from x to y. In an example variant, the first data set 124 includes a source document x, (alternatively referred to as a first source token set) denoted as a sequence of S words: $x=x_1, x_2, \ldots, x_S$).

The pre-processing can include, where the first source token set (e.g., an article) includes a plurality of source tokens (x) and truth tokens (e.g., keyphrases)(y), concatenating all the ground truth key phrases (truth tokens) y in the given first data set document-key phrases pairs (x,y), into a single linearized output sequence=$y^1 \diamond y^2 \diamond \ldots y^{|y|}$, where $\diamond$ denotes a special delimiter token that is inserted in between consecutive key phrases (truth tokens).

The system 100 includes an encoder 104 and a decoder 106 which are used to generate the predicted keywords.

The encoder 104 may be a bi-directional LSTM encoder which reads the variable length source sequence (e.g., a first source token set) $x=(x_1, \ldots, x_i, \ldots, x_S)$ and produces a sequence of hidden state representations (e.g., first source token set encoder representation) $h=(h_1, \ldots, h_i, \ldots, h_S)$ with $h_i \in R^{d_h}$, using the operation $h_i=f_{enc}(x_i, h_{i-1})$ where $f_{enc}$ is a differentiable non-linear function.

The encoder 104 may be another machine learning architecture capable of generating hidden states or latent representation by compressing input data. For example, in one variant, the encoder 104 includes multiple convolutional layers.

In example embodiments, the decoder 106 is a uni-directional LSTM, which computes a hidden state $s_t \in R^{d_s}$ at each decoding time step based on a non-linear function defined as $s_t=f_{dec}(e_{t-1}, s_{t-1})$. In the described embodiment, at training time, $e_{t-1}$ is the embedding of the ground truth previous word and at inference time, it is the embedding of predicted word from the vocabulary in the previous time step. The decoder 106 may be another machine learning architecture capable of generating the hidden state. For example, the decoder 106 may be a GRU (gated recurrent unit), or other variants.

The system 100 may also include one or more attention mechanisms 114. The attention mechanisms 114, when coupled with the basic S2S architecture which includes the encoder 104 and the decoder 106, may make it possible to dynamically align source information (e.g., source tokens within the first source token set) with the target hidden states during the decoding process.

In some embodiments, for example, alignment between main source information (e.g., first source token set) and the target hidden states during the decoding process may be achieved by computing an alignment score between the decoder hidden state s t and each of the encoder hidden representations $\{h_i\}_{i=1}^{S}$ (e.g., respective source token of the first source token set encoder representation). In the described embodiments, at decoding time step t, the alignment score (e.g., the attention mechanism interrelation value) may be determined by:

$$\tilde{\alpha}_{ti}=s_t W_\alpha h_i \quad (1)$$

where $W_\alpha$ is a learnable attention weight matrix.

The scores are then normalized to obtain a probability distribution across the source tokens (e.g., the attention mechanism interrelation value between the respective source token encoder representation and the hidden state)

$$\alpha_{ti} = \frac{\exp\{\tilde{\alpha}_{ti}\}}{\sum_{i'=1}^{S} \exp\{\tilde{\alpha}_{ti'}\}} \quad (2)$$

where $\alpha_{ti}$ is the attention weight vector. Next the attention context vector as a weighted summation across source hidden states is computed:

$$c_t=\Sigma_{i=1}^{S}\alpha_{ti}h_i \quad (3)$$

Finally, the probability distribution over a predefined vocabulary $V_{Target}$ of tokens is obtained through the use of the following equation:

$$P_{target}(y_t)=\text{softmax}(W_v \tilde{s}_t); \text{ where } \tilde{s}_t=\tanh(W_u[s_t;c_t]) \quad (4)$$

$W_u$ and $W_v$ are trainable decoder parameters and $y_t \in V_{Target}$. For notational brevity, the bias terms are omitted.

According to some embodiments, the system 100 further includes a copy data model architecture 112 to alleviate the out-of-vocabulary issue during generation, by allowing the decoder to selectively copy tokens from the source document.

In an example embodiment, the decoder 106 includes a learnable switching parameter $p_{gen}=\text{sigmoid}(W_c[s_t; c_t; e_{t-1}])$ (alternatively referred to as the vocabulary token parameter) which refers to the probability of generating a token from the target vocabulary $V_{Target}$. The term $(1-p_{gen})$ therefore corresponds to the probability of copying a token present on the source side with dynamic vocabulary denoted by $V_X$ (e.g., the generator architecture 110). The generation probability and the copy probability are then combined to predict the next token as follows:

$$P(\gamma_t)=P_{gen}P_{target}(\gamma_t)+(1-P_{gen})P_{copy}(\gamma_t) \quad (5)$$

where $\gamma_t \in V_{Target} \cup V_x$ and $P_{copy}(\gamma_t)=\Sigma_{i:x_i=\gamma_t}\alpha_{ti}$ (e.g., the copy data model architecture 112) is the copy probability of token $\gamma_t$ defined as a sum of its attention weights across all its occurrences in the source text.

Training the encoder 104 and decoder 106 models for sequence generation includes updating the constituent plurality of parameters of the encoder 104 and decoder 106 based on the Maximum Likelihood Estimation (MLE). For a given instance in the training data, the MLE objective corresponds to learning the model parameters θ that minimizes the negative log-likelihood loss defined as follows (e.g., the loss based on the comparison between the predicted keyword and the associated ground truth token):

$$L_{MLE}=-\Sigma_{t=1}^{L} \log P(\gamma_t|\gamma_{1:t-1},x,\theta) \quad (6)$$

where $\gamma_t$ is the t-th token in the ground truth output sequence γ whose total length is L tokens.

Communication network 118 may include a packet-switched network portion, a circuit-switched network portion, or a combination thereof. Communication network 118 may include wired links, wireless links such as radio-frequency links or satellite links, or a combination thereof.

Communication network 118 may include wired access points and wireless access points. Portions of communication network 118 could be, for example, an IPv4, IPv6, X.25, IPX or similar network. Portions of network 118 could be, for example, a GSM, GPRS, 3G, LTE or similar wireless networks. Communication network 118 may include or be connected to the Internet. When communication network 118 is a public network such as the public Internet, it may be secured as a virtual private network.

Proposed Approach: Overview

To improve diversity of key phrase generation, the inventors propose two training strategies, while adhering to the same overall model architecture.

Firstly, the inventors adopt unlikelihood training for sequence-to-sequence setting by directly penalizing the decoder for either generating or copying repeating tokens with a generation loss. Alternatively stated, the inventors propose the use of a generation loss (based on words determined to be likely by a generation data model architecture 110) and a copy in training the S2S machine learning model.

Secondly, the inventors propose an approach which may improve the planning capability of the decoder by incorporating a K-step ahead token prediction loss (e.g., future prediction losses). This is achieved by using the same decoder hidden state but different attention mechanisms to decide which source tokens to be attended to, for predicting the target at the current time step, 1-step ahead and so on. Control of such attention mechanisms is provided for by the K-step determiner 108 in some embodiments.

FIG. 1 provides an example block schematic of a system that can be configured to implement the approach.

Target Token Unlikelihood Loss

The goal of unlikelihood training is to suppress the model's tendency to assign high probability to unnecessary tokens such that the automatically generated key words or key phrases have improved diversity.

During decoding, say at time step t, the system can be configured to computationally maintain a negative candidate list $C_{Target}^{t}$ (e.g., a first exclusion list) which consists of tokens that should ideally be assigned a low probability for the current time step prediction.

Formally, given $C_{TargetUL}^{T}=\{c_1, \ldots, c_m\}$ (e.g., the first exclusion list) where $c_j \in V_{Target}$ (e.g., where the first exclusion list is a list of target vocabulary tokens), the unlikelihood loss (e.g., generation loss) based on the target vocabulary across all time steps is defined as:

$$L_{TargetUL}=-\Sigma_{t=1}^{L}\Sigma_{c\in C_{Target}^{t}} \log(1-P_{target}(c|\gamma_{1:t-1},x,\theta)) \quad (7)$$

Intuitively, assigning a high probability to a negative candidate token leads to a larger loss. Following welleck-ul, the negative candidate list (e.g., the first exclusion list) for $L_{TargetUL}$ consists of the ground truth context tokens from the previous time steps, i.e., $C_{Target}^{t}=\{\gamma_1, \ldots, \gamma_{t-1}\}\setminus\{\gamma_t\}$. In this manner, the inventors effectively discourage the model from repeatedly generating tokens that are already present in the previous contexts.

The exclusion lists can be maintained, for example, in computer memory as data objects, such as linked lists, arrays, or lists of pointers.

Copy Token Unlikelihood Loss

In contrast to welleck-ul who introduces UL training for a language model setting, the inventors propose employing a method for a sequence-to-sequence task. As described herein, the decoder 106 may utilize a copy mechanism (e.g., a copy data model architecture 112) that dynamically creates an extended vocabulary during generation based on the source tokens ($V_x$).

An undesirable side-effect of copying is that the model (e.g., the encoder 104 and decoder 106) might repeatedly attend to (and copy) the same set of source tokens over multiple decoding time steps, leading to repetitions in the output.

To circumvent this issue, the inventors propose a technical approach they refer to as copy token unlikelihood loss, or alternatively copy loss that the system can be configured to utilize in improving the automatically generated outputs.

For penalizing unnecessary copying, the negative candidate list (e.g., the second exclusion set) at each time step is composed of context tokens (e.g., previously processed source tokens) from previous time steps that also appear in the source text (e.g., a first source token set), and thus can be copied.

The Copy Loss May be Described as:

$$L_{CopyUL}=-\Sigma_{t=1}^{L}\Sigma_{c\in C_{Copy}^{t}} \log(1-P_{copy}(c|\gamma_{1:t-1},x,\theta)) \quad (8)$$

where the second exclusion list, $C_{Copy}^{t}=\{\gamma_i|\gamma_i\in\{\gamma_1, \ldots, \gamma_{t-1}\}\setminus\{\gamma_t\}$ is a list of source tokens of the first source token set; $\gamma_i\in V_x\}$, and $P_{copy}(c|.)$ refers to the probability of copying a given token c determined by the attention mechanism over the source tokens.

Figure 2:
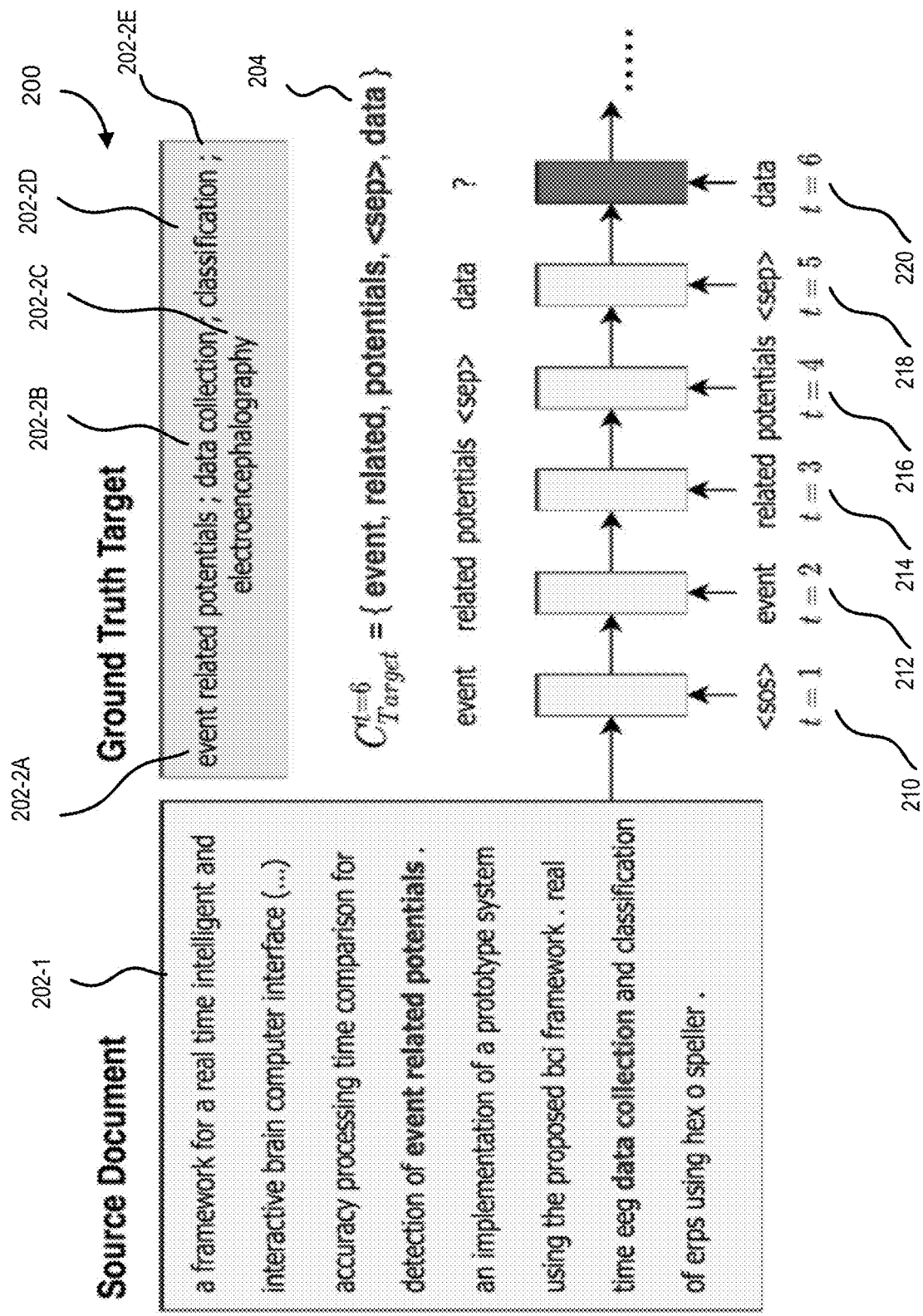
FIG. 2 is a visual representation of an example system for diverse keyword generation having unlikelihood loss, according to some embodiments.

Referring now to FIG. 2, a visual representation of an example approach for diverse keyword generation having unlikelihood loss is shown.

A source document 202-1 is received by the system for processing. The source document 202-1 can be received in various formats, such as a string data object including a set of character data fields, tokenized words, plaintext, XML, JSON, among others. Where source document 202-1 is received in a raw format (e.g., an image file), an additional pre-processing step can be utilized to convert the source document 202-1 into a useable format (e.g., string tokenized). The source document 202-1 can include, for example, data objects representing analyst reports, scientific articles, conversation records, among others. An objective of a user may be to provide the source document 202-1 such that keywords or key phrases can be automatically generated, which can then be utilized for classification, appending metadata, categorization, and/or summarization of the source document 202-1, depending on the configuration of the system. The source document 202-1 can be received from upstream computing systems, and the post-processing can be conducted by a downstream computing system.

In FIG. 2, at decoding time step t=6, (e.g., step 220) the previous tokens (e.g., the tokens of steps 210 (<sos>, an initializer token), 212 (event), 214 (related), 216 (potentials), and 218 (<sep>, a delimiter token)) from the target context (202-1, alternatively referred to as the first source token set) form the negative candidate list (e.g., the second exclusion list 204), denoted by $C_{Target}^{t=6}$.

The Target UL loss (e.g., the generation loss) is computed based on the probabilities assigned to these tokens. Similarly, the Copy UL loss (e.g., the copy loss) discourages the model for copying certain words (event, related, potentials, <sep>, and data at 204) from the source document 202-1 at t=6.

Ideally, the model of the system is configured to copy the word 'collection', which is the next ground truth token in the ground truth token set 202-2E (e.g., after ground truth token string 202-2A (event related potentials) and after the previous ground truth token 202-2B (data).

Figure 3:
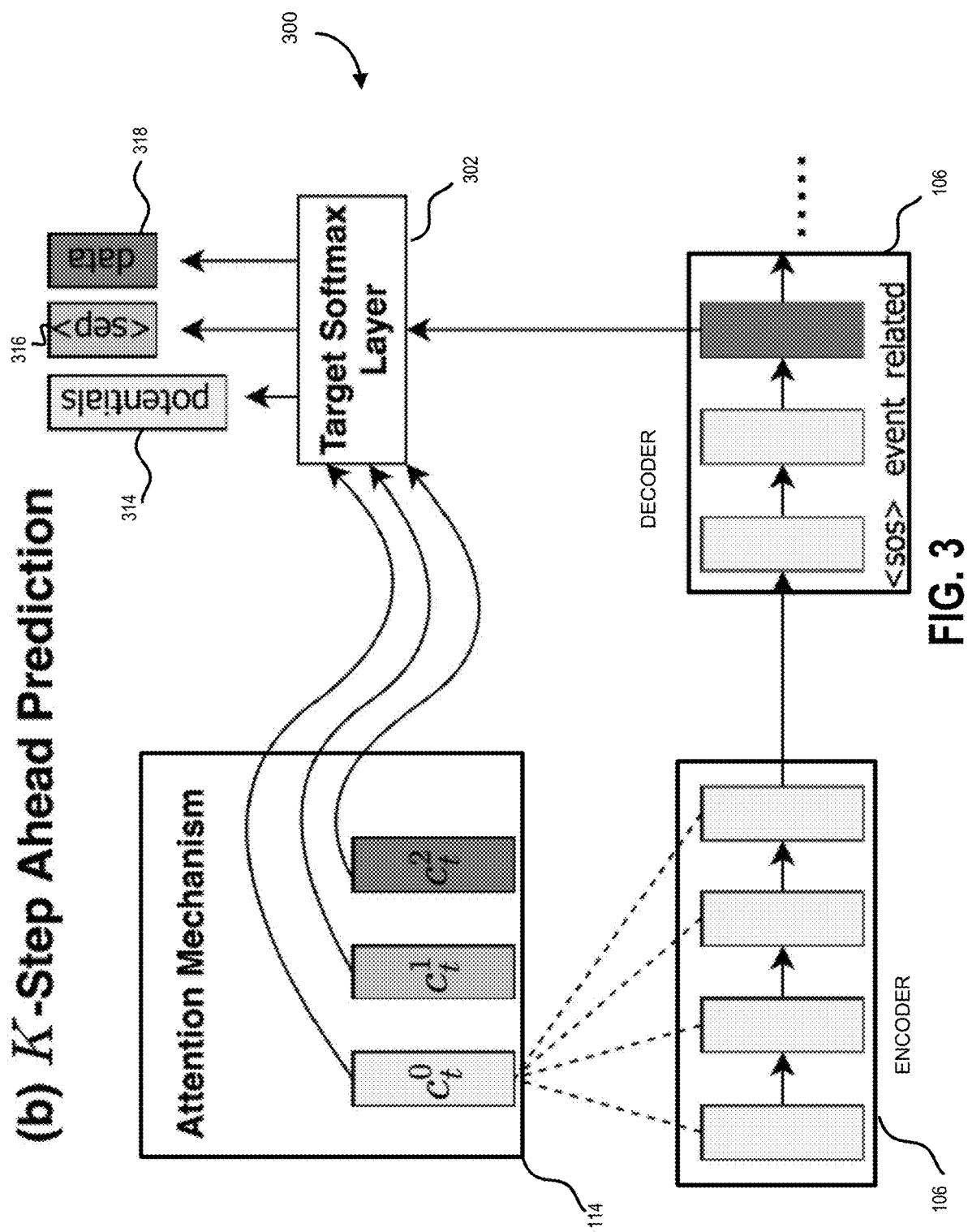
FIG. 3 is a visual representation of an example system for diverse keyword generation acting having k-step prediction, according to some embodiments.

Referring now to FIG. 3, a schematic diagram 300 of a system 300 for predicting keywords with a K-step ahead prediction (e.g., a future keyword predictor) is shown according to example embodiments.

K-step ahead token prediction loss is an additional improvement that is adapted to modify a training objective to yield a technical improvement whereby there is better model planning during the automatic decoding process.

In K-step ahead token prediction, the greedy approach is instead replaced by configuring the system to instead incorporate the prediction of tokens K-steps ahead of the the current time step into the training objective. This may be achieved using a K-step determiner 108 in some embodiments.

In the shown embodiment, the decoder 106 is configured to predict two future keywords in addition to the predicted keyword, (e.g., with K=2).

Different attention matrices (generated based on the attention mechanism 114) are used to compute the corresponding attention context vectors for k=0,1,2 (e.g., the first $c_t^0$, second $c_t^1$, and third $c_t^2$ attention mechanism interrelation values) which is then fed to the softmax layer 302 over the vocabulary along with the decoder 106 hidden state. In the shown embodiment, the softmax layer 302 is shown as having three corresponding potential predicted tokens, namely "potentials" token 314, <sep> token 316 (e.g., a placeholder or delimiter token) and "data" token 318.

Copy mechanism (e.g., copy data model architecture 112) is omitted from FIG. 3 for simplicity.

K-Step Ahead Token Prediction Loss

Key phrases are made up of one or more tokens. In a naïve approach, the decoder 106 in S2S models is tasked with simply predicting the next token given the context so far. As noted above, this greedy approach does not incentivize the model to plan for the upcoming future tokens ahead of time.

The inventors mitigate this issue by configuring the system for directly incorporating the prediction of tokens K-steps ahead from the current time step into the training objective.

To do so, the inventors start with Equation 6, the MLE-based objective for next token prediction at time step t. This can be adapted for the prediction of up to K tokens ahead in time as follows:

$$L_{K\text{-}StepMLE} = -\Sigma_{t=1}^{L} \Sigma_{k=0}^{K} \gamma_k \log P(\gamma_{t+k}|\gamma_{1:t-1}, x, \theta) \tag{9}$$

where $\gamma_k$ refers to the coefficient of the kth step ahead token prediction loss. Note that the next token prediction MLE objective in Equation 6 is a special case of Equation 9 where K=0 and $\gamma_0$=1.0.

One can consider the K-step ahead losses as a technical improvement that is adapted to configured the model to reward the model to plan the surface realization of the output sequence ahead of time. To assign high weightage to current token prediction (i.e., for k=0) and relatively downweight the losses incurred from future token predictions, the system is configured to linearly decay the coefficient $\gamma_k$ by setting $$\gamma_k = \frac{1.0}{k+1}.$$

For K-Step ahead prediction, the inventors consider two implementation choices:

(1) For each k, learn a different transformation $W_v^k$ (in Equation 4) from the hidden representation to the logits over the vocabulary $V_{Target}$. However, this drastically increases the number of model parameters by $k \times d_{s_t} \times |V_{Target}|$ where $d_{s_t}$ is the decoder hidden size.

(2) With the second option, for each k, a different attention weight matrix is $W_\alpha^k$ is learnt, while having a shared output transformation layer based on $W_v$. More specifically, Equations 1, 2 and 3 can be re-written as:

$$\alpha_{ti}^k = s_t W_a^k h_i; \ \alpha_{ti}^k = \frac{\exp\{\tilde{\alpha}_{ti}^k\}}{\sum_{i'=1}^{S} \exp\{\tilde{\alpha}_{ti'}^k\}}; \ c_t^k = \sum_{i=1}^{S} \alpha_{ti}^k h_i. \tag{10}$$

The consideration behind such a formulation is that the different attention mechanisms (for different k's) learn different weighting schemes over the source tokens that enables the prediction of the future token at time step t+k. Moreover, this is much more parameter efficient because the number of extra parameters introduced into the model is only $k \times d_{s_t} \times d_{s_t}$, where $d_{s_t} \ll |V_{Target}|$.

Hence, the inventors, in example embodiments, adopt the second implementation choice in the experiments, but the first implementation choice is also contemplated in various embodiments.

K-Step Ahead Unlikelihood Loss

Earlier, the inventors introduced an MLE-based loss for the task of K-step ahead token prediction. This approach can be extended to the unlikelihood setting. Concretely, the inventors impose the target and copy unlikelihood losses on the K-step ahead token prediction task as follows:

$$L_{K\text{-}StepTargetUL} = -\Sigma_{t=1}^{L} \Sigma_{k=0}^{K} \gamma_k \Sigma_{c \in C_{Target}^{t+k}} \log (1 - P_{target}(c|\gamma_{1:t-1}, x, \theta)) \tag{11}$$

$$L_{K\text{-}StepCopyUL} = -\Sigma_{t=1}^{L} \Sigma_{k=0}^{K} \gamma_k \Sigma_{c \in C_{Target}^{t+k}} \log (1 - P_{target}(c|\gamma_{1:t-1}, x, \theta)) \tag{12}$$

where the negative candidate lists are $C_{Target}^{t+k}=\{\gamma_1, \ldots, \gamma_{t+k-1}\}\backslash\{\gamma_{t+k}\}$ (the first exclusion list for ground truth tokens) and $C_{Copy}^{t+k}=\{\gamma_i|\gamma_i\in\{\gamma_1, \ldots, \gamma_{t+k-1}\}\backslash\{\gamma_{t+k}\}$ and $\gamma_i\in V_x\}$ (the second exclusion list for ground truth tokens and source tokens). Penalizing the model for future repetitions through the K-step ahead unlikelihood losses should further enhance overall diversity of the outputs.

Overall Training Objective

To summarize, in some embodiments, the S2S model is trained with a combination of likelihood and unlikelihood losses on the current (k=0) and future (k=1, . . . , K) token prediction tasks.

The overall loss function is given by (e.g., the copy loss, the generation loss, and a comparison of the predicted keyword and a respective predicted keyword ground truth token to penalize the decoder for generating repetitive keywords):

$$L = L_{K\text{-}StepMLE} + \lambda_T L_{K\text{-}StepTargetUL} + \lambda_C L_{K\text{-}StepCopyUL} \quad (13)$$

where $\lambda_T$ and $\lambda_C$ are hyperparameters that control the weight of target and copy UL losses respectively.

Experiment Set-Up

To measure the quality of generated key phrases, i.e., its relevance with respect to the source document, the inventors compare the generated set of KPs to the KPs in the ground truth data. To this end, the inventors report $F_1@M$, where M refers to the number of model predicted key phrases. The inventors also include the corresponding precision and recall metrics.

Abstractive S2S models are capable of generating a variable number of key phrases depending on the source document, in comparison to traditional extractive methods where one is required to specify a cut-off in order to output the top-k key phrases.

However, different from previous work, the inventors report the overall $F_1@M$ score rather than separately computing this score for key phrases present vs. absent in the source text. This is because the goal in this work is to overcome the lack of diversity issue in key phrase generation models, and not necessarily to generate more absent key phrases.

In order to evaluate the model outputs on the criterion of diversity, the inventors define the following metrics:

$$\% \text{ Duplicate } KPs = \left(1 - \frac{NumberofUniqueKeyphrases}{TotalNumberofGeneratedKeyphrases}\right) * 100$$

$$\% \text{ Duplicate Tokens} = \left(1 - \frac{NumberofUniqueTokens}{TotalNumberofGeneratedTokens}\right) * 100$$

KPs: The inventors report the number of key phrases generated. Ideally, the model should generate the same number of key phrases as present in the ground truth output sequence.

The next three metrics measure the inter-key phrase similarity among the generated set of key phrases—a lower value indicates fewer repetitions and thus more diversity in the output.

Self-BLEU: The inventors use Self-BLEU which computes pairwise BLEU score between generated KPs. This metric captures word level surface overlap.

EditDist: String matching can also be carried out at the character level. Through the EditDist metric, the inventors determine the pairwise Levenshtein Distance between KPs output by the model. The inventors may utilize the fuzzywuzzy library in Python.

EmbSim: With Self-BLEU and EditDist, The inventors can only capture surface level repetitions between KPs. To overcome this limitation, the inventors propose, in some embodiments, to use pre-trained phrase-level embeddings that measures inter-key phrase similarity at a semantic level. Specifically, the inventors compute pairwise cosine similarities between Sent2Vec embedding representations of key phrases. Sent2Vec has been reported to perform well in previous work on key phrase extraction. All the above metrics are computed for each test set output, followed by averaging across all records.

Datasets

To demonstrate the diversity improvements that the model provides, the inventors carry out experiments on datasets from multiple domains. KP20K is a dataset from the domain of scientific articles. KPTimes consists of news articles and editor assigned key phrases. StackEx is a dataset curated from a community question answering forum with key phrases being the user assigned tags.

Baselines

The inventors compare the proposed approach to five S2S key phrase generation baselines (4 MLE-based models and 1 which uses a reinforcement learning objective)—

(1) catSeq: A S2S model trained solely using the MLE objective. (refer to Equation 6).
(2) catSeqD: Introduced by yuan-catseqkp, this method uses auxiliary semantic coverage and orthogonality losses to enhance generation diversity.
(3) catSeqCorr: chen2018 keyphrase augments the attention scheme in the catSeq model with a coverage module and review mechanism.
(4) catSeqTG: Instead of simply concatenating the article title and abstract together to form the source document, tgnet-2018 design a model architecture that separately encodes the title information using an attention-guided matching layer.
(5) catSeqTG-2RF1: reinforce-kp extends the catSeqTG model by training it using a reinforcement learning (RL) objective where $F_1$-score is directly used as the reward.

Additional results on five datasets that only provide a test set for evaluation (INSPEC, KRAPIVIN, NUS, SEMEVAL, DUC) are available. The inventors may use the open-source code provided by reinforce-kp for implementing the baselines.

Improved technical results were obtained.

TABLE 3

KP generation results on datasets from 3 domains, evaluated on both quality and diversity criteria (highest metric indicted in bolding).

| | | Quality Evaluation | | | Diversity Evaluation | | | | | |
|---|---|---|---|---|---|---|---|---|---|---|
| | | P@M | R@M | P@M | R@M | P@M | R@M | P@M | R@M | P@M |
| Scientific Articles- KP20K | Ground Truth | — | — | — | ->5.3 | 0.1 | 7.3 | 3.8 | 32.7 | 0.159 |
| | catSeq | 0.291 | 0.26 | 0.274 | 7.3 | 26.6 | 36 | 26.6 | 45.6 | 0.328 |
| | catSeqD | 0.294 | 0.257 | 0.274 | 6.7 | 25.7 | 35.3 | 27 | 45.3 | 0.325 |
| | catSeqCorr | 0.283 | 0.264 | 0.273 | 7 | 23.2 | 33.5 | 24.5 | 44 | 0.309 |
| | catSeqTG | 0.295 | 0.262 | 0.278 | 6.8 | 24.7 | 34.3 | 26.2 | 45.2 | 0.323 |

TABLE 3-continued

KP generation results on datasets from 3 domains, evaluated on both quality and diversity criteria (highest metric indicted in bolding).

|  |  | Quality Evaluation | | | Diversity Evaluation | | | | | |
|---|---|---|---|---|---|---|---|---|---|---|
|  |  | P@M | R@M | P@M | R@M | P@M | R@M | P@M | R@M | P@M |
|  | catSeqTG-2RF1 | 0.274 | 0.286 | 0.280 | 7.5 | 30.9 | 41.7 | 30.7 | 46.7 | 0.341 |
|  | DivKGen(UL) | 0.277 | 0.261 | 0.269 | 5.0 | 5.3 | 12.6 | 9.7 | 34.4 | 0.181 |
|  | +K-StepMLE | 0.274 | 0.239 | 0.255 | 4.6 | 6.1 | 13.9 | 11.5 | 36.2 | 0.197 |
|  | +K-StepUL | 0.273 | 0.24 | 0.256 | 4.6 | 4.9 | 11.7 | 8.8 | 35.2 | 0.185 |
| News | Ground Truth | — | — | — | ->5.0 | 0.1 | 4.9 | 2.2 | 26.5 | 0.135 |
| Articles- | catSeq | 0.399 | 0.375 | 0.387 | 5.9 | 13.7 | 20.7 | 17.2 | 32.7 | 0.202 |
| KPTimes | catSeqD | 0.395 | 0.374 | 0.384 | 6.2 | 15.8 | 22.6 | 18.3 | 33.5 | 0.212 |
|  | catSeqCorr | 0.397 | 0.376 | 0.386 | 5.6 | 10.3 | 17.6 | 13.8 | 31.6 | 0.19 |
|  | catSeqTG | 0.402 | 0.38 | 0.391 | 5.9 | 13.8 | 21.2 | 17.6 | 32.8 | 0.203 |
|  | catSeqTG-2RF1 | 0.389 | 0.386 | 0.387 | 6 | 14 | 21 | 18.6 | 32.5 | 0.192 |
|  | DivKGen | 0.385 | 0.32 | 0.35 | 4.3 | 2.3 | 7.0 | 4.2 | 27.8 | 0.142 |
|  | +K-StepMLE | 0.391 | 0.316 | 0.349 | 4.3 | 3.3 | 7.9 | 5.3 | 27.9 | 0.147 |
|  | +K-StepUL | 0.371 | 0.314 | 0.340 | 4.6 | 3.6 | 8.7 | 5.8 | 28.3 | 0.149 |
| Community QA- | Ground Truth | — | — | — | ->2.7 | 0.3 | 2.9 | 1.5 | 24.2 | 0.167 |
| StackEx | catSeq | 0.526 | 0.518 | 0.522 | 2.7 | 4.3 | 7.4 | 4.1 | 28.2 | 0.226 |
|  | catSeqD | 0.51 | 0.524 | 0.517 | 2.8 | 5 | 8.6 | 4.8 | 28.8 | 0.23 |
|  | catSeqCorr | 0.501 | 0.526 | 0.513 | 2.9 | 5.4 | 9.3 | 5.2 | 29.1 | 0.235 |
|  | catSeqTG | 0.522 | 0.529 | 0.526 | 2.8 | 3.5 | 7 | 3.9 | 27.5 | 0.216 |
|  | catSeqTG-2RF1 | 0.433 | 0.570 | 0.492 | 3.8 | 6.7 | 11.8 | 6.2 | 29 | 0.22 |
|  | DivKGen | 0.512 | 0.453 | 0.481 | 2.2 | 0.3 | 1.4 | 0.50 | 23.3 | 0.175 |
|  | +K-StepMLE | 0.532 | 0.438 | 0.480 | 2 | 0.4 | 1.5 | 0.6 | 23.1 | 0.171 |
|  | +K-StepUL | 0.516 | 0.454 | 0.483 | 2.2 | 0.4 | 1.6 | 0.7 | 23.7 | 0.170 |

Results and Analysis

The inventors report quality and diversity metrics on five baselines and three variants of the proposed approach based on experiments across datasets from three different domains (Table 3).

The inventors refer to the proposed model as DivKGen; the base UL variant is trained with the regular MLE objective plus target and copy level unlikelihood losses. The rows denoted by +K-StepMLE and +K-StepUL are variants build on top on the base variant, by cumulatively incorporating K-Step ahead token prediction MLE and K-Step ahead UL losses respectively.

For each dataset, The inventors also report the ground truth diversity statistics. For instance, the KP20K has an average key phrase count of 5.3 in the test set with only 0.1% duplicate key phrases and 7.3% duplicate tokens. In comparison, the MLE baseline (catSeq) produces a much larger percentage of repetitions. This is also evident from the inter-key phrase pairwise similarity metrics, namely Self-BLEU, EditDist and EmbSim.

Surprisingly, the previous best performing model catSeqTG-2RF1, which uses an RL approach to improve $F_1$ score, does worse than all the MLE baselines in terms of diversity metrics.

In contrast, DivKGen, the proposed approach may achieve much better diversity than all baselines. The repetition percentages are lowered and are relatively closer to the ground truth. There is a large boost by simply adding token and copy UL losses to the baseline MLE model. For KP20K dataset, the inventors obtain small diversity gains through the incorporation of K-Step ahead losses whereas for the other two datasets, it does not result an improvement. A possible explanation is that the base DivKGen (UL) variant itself steers the diversity statistics to be quite close to that of the ground truth of these datasets. As a result, it becomes increasingly difficult to achieve a further reduction in this gap through any additional model changes.

With regards to quality evaluation metrics, it can be observed that DivKGen models have slightly lower scores. This can be explained from a quality-diversity trade-off viewpoint. As the model attempts to explore the output space through the generation of more interesting KPs, it may output new KPs that are not present in the ground truth, thus resulting in lower precision. DivKGen generates shorter sequences (and hence may not be able to produce all the KPs as per the ground truth) than the baselines, which could explain the lower recall.

Quality-Diversity Trade-off

The inventors further analyze the quality-diversity trade-off of the model. The inventors train different versions of DivKGen (UL) model on KP20K dataset by varying $\lambda_T$, the UL loss coefficient (refer to Equation 13).

Figure 4:
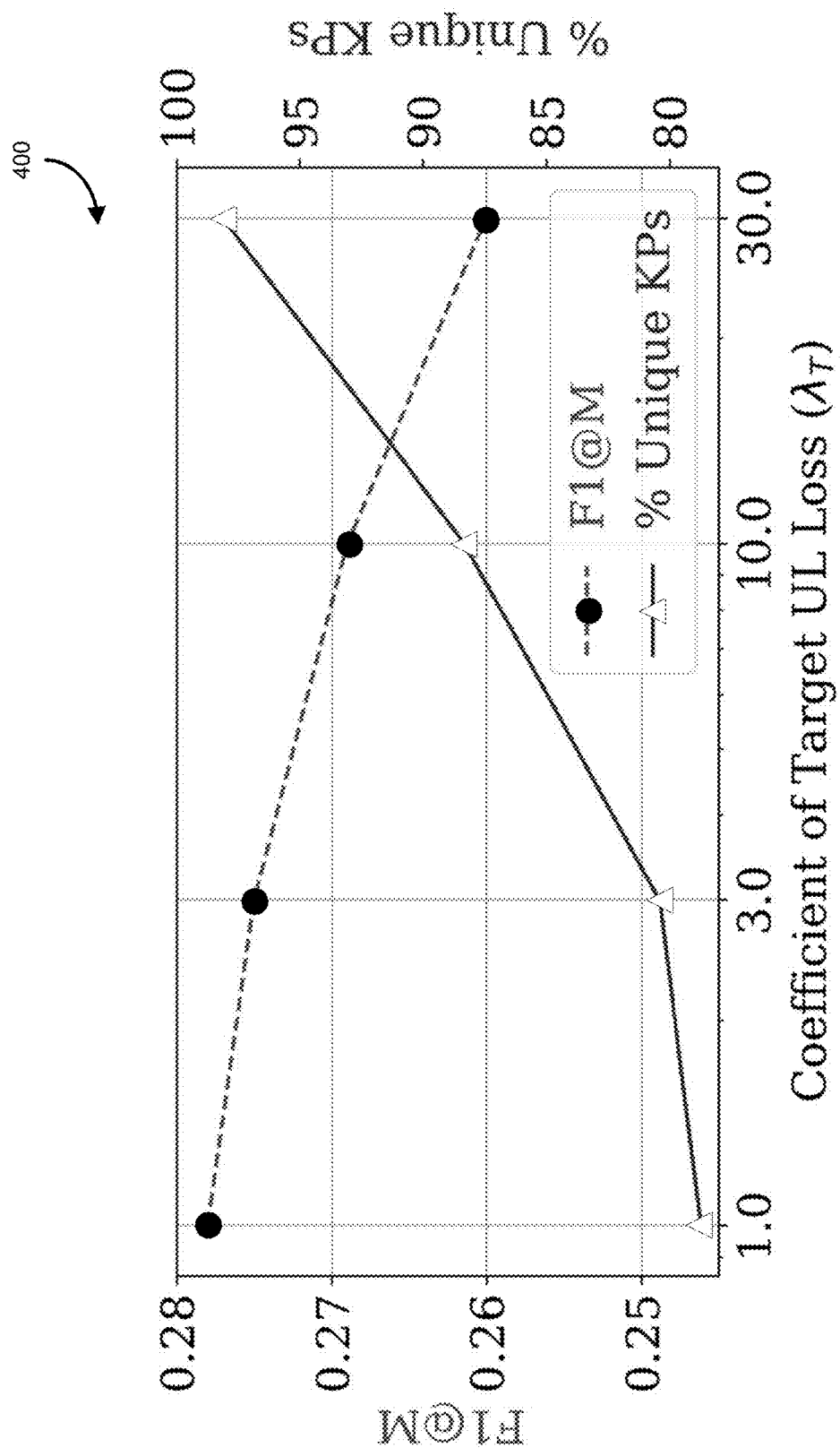
FIG. 4 is a graph diagram showing quality—diversity trade-offs of example systems for diverse keyword generation, according to some embodiments.

For simplicity, the inventors set $\lambda_T = \lambda_C$ to control the number of variable hyperparameters in the quality-diversity trade-off analysis. As depicted in FIG. 4, it can be seen that there is an obvious quality-diversity trade-off. For higher values of $\lambda_T$, the inventors achieves a higher level of diversity (more unique KPs) at the cost of quality (and vice versa). Similar behaviour has been reported previously in the text generation literature.

Hence, the inventors recommend tuning the hyperparameters $\lambda_T$ and $\Delta_C$ to achieve a desired level of diversity; the inventors further analyze the quality-diversity trade-off of the model. The inventors train different versions of DivKGen (UL) model on KP20K dataset by varying $\lambda_T$, the UL loss coefficient (refer Equation 13). As depicted in FIG. 4, it can be seen that there is an obvious quality-diversity trade-off. For higher values of $\lambda_T$, the inventors achieve a higher level of diversity (more unique KPs) at the cost of quality (and vice versa). Similar behaviour has been reported previously in the text generation literature. Hence, the inventors recommend tuning the hyperparameters $\lambda_T$ and $\Delta_C$ to achieve a desired level of diversity.

Ablation Studies

The inventors conducted an ablation study to investigate the effect of losses that the inventors introduce in variant approaches. The inventors start with the MLE baseline and add the different loss components one-by-one as presented in Table 4.

It is evident that the best diversity scores are obtained while using the full model (last row). Also, interestingly each individual loss component by itself (i.e., TargetUL, CopyUL and K-StepMLE), is not as effective as their combination. This suggests that each of the losses contribute in a synergetic manner to maximize diversity gains.

TABLE 4

Ablation study on the KP20k dataset. Each row denotes a DivKGen model variant obtained by adding the specified component. The last row corresponds to the full model.

| DivKGen Variants | Overall $F_1@M\uparrow$ | % Duplicate KPs$\downarrow$ | % Duplicate Tokens$\downarrow$ | Self-BLEU$\downarrow$ |
|---|---|---|---|---|
| w/TargetUL | 0.277 | 12.0 | 19.8 | 16.7 |
| w/CopyUL | 0.263 | 14.1 | 22.7 | 19.9 |
| w/K-StepMLE | 0.265 | 12.6 | 18.9 | 16.3 |
| w/TargetUL + CopyUL | 0.269 | 5.3 | 12.6 | 9.7 |
| +K-StepMLE | 0.255 | 6.1 | 13.9 | 11.5 |
| +K-StepUL | 0.256 | 4.9 | 11.7 | 8.8 |

Referring now to FIG. 4, a chart 400 of the quality-diversity trade-off of an example system, according to example embodiments, is shown. FIG. 4 is an illustration of quality-diversity trade-off: % Unique KPs=(100-% Duplicate KPs) is used as a representative metric for diversity.
Related Work: Key phrase Generation and Extraction Traditionally, the approach for summarizing documents using key phrases generally followed a two-step approach: (1) extract candidate phrases from the source document using heuristics; (2) rank these candidates based on some measure of relevance or importance. Methods like TextRank, TopicRank and EmbedRank fall under this category. meng-deep-kp formulate key phrase generation as a sequence-to-sequence learning problem, with an advantage over previous extractive methods that it could generate both present and absent key phrases from the source text.

However, their approach had a limitation that one was still required to rank the top-k KPs. This was addressed in works which could generate a variable number of KPs depending on the input. The inventors adopt a similar setup but carry out a comprehensive analysis of such models in terms of their output diversity, which has been largely ignored in previous work.

Figure 5:
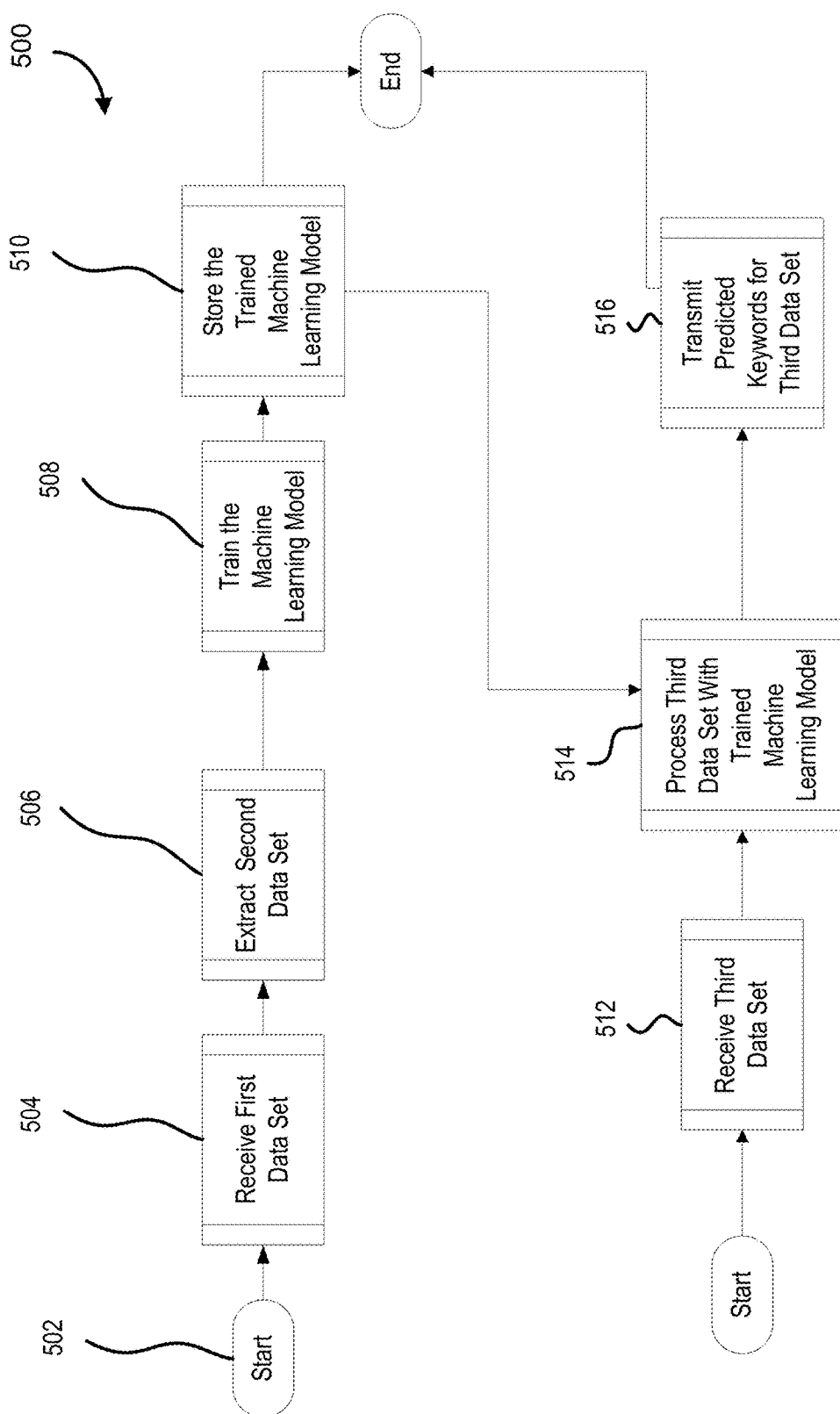
FIG. 5 is a method diagram illustrating a method for processing data sets with a trained machine learning model, according to some embodiments.

Referring now to FIG. 5, a method 500 of processing data sets with a trained machine learning model, according to example embodiments, is shown.

At step 502, the system 100 initiates a training program.

At step 504, the system 100 receives the first data set. As described herein, the first data set may be first data set 124 having a plurality of source token sets and related ground truth token sets. For example, the plurality of source token sets and related ground truth token sets can be articles and related labelled keywords, respectively.

At step 506, the system 100 extracts a second data set of target vocabulary tokens from the first data set, where the second data set comprises a subset of source tokens and related ground truth tokens of the first data set. For example, the system 100 may extract as a set of target vocabulary tokens the 10,000 most used tokens in all the articles in first data set.

At step 508, the system 100 trains the S2S machine learning model (e.g., the encoder 104 and decoder 106) based on the MLE loss, the copy loss and the generation loss. In some embodiments, the k-step ahead losses are also used to train the machine learning model.

At step 510, the system 100 stores the trained machine learning model. For example, the system 100 may store the machine learning model in database 102.

At step 512, the system 100 may receive a third data set. The third data set includes a plurality of source tokens, and can be, for example an article, etc.

At step 514, the system 100 processes the third data set with the stored trained machine learning model to generate predicted keywords for the third data set.

At step 516, the system 100 transmits the generated predicted keywords for the third data set. In some embodiments, the generated predicted keywords for the third data set are transmitted within the system 100, for example to an interface, or external to the system, such as sink device 124.

Diversity in Language Generation

Diversity promoting objectives for text generation have been previously explored. However, these studies examine the overall corpus level diversity. For instance, the lack of diversity in a dialogue system, due to the fact that the model generates frequently seen responses from the training set.

The inventors address a different type of diversity technical challenge, arising as a result of repetitions occurring within individual outputs. Thus neural unlikelihood training is well suited to the problem. Test time decoding strategies to improve diversity such as top-k sampling, nucleus sampling and diverse beam search are orthogonal to the approach and can naturally be incorporated.

As described herein, the inventors first point out the shortcomings of MLE based training for key phrase generation. The inventors specifically address the lack of output diversity issue via the use of unlikelihood training objective.

The inventors propose a system that adopts a target level unlikelihood loss and propose a novel copy token unlikelihood loss, the combination of which provides large diversity gains. In addition, a K-step ahead MLE and UL objective is incorporated in a variation into the training. Through extensive experiments on datasets from three different domains, the inventors demonstrate the effectiveness of the model for automated key phrase generation having improved technical characteristics associated with output diversity. This is particularly useful in use cases relating to automatic summarizing, metadata generation, among others.

The inventors summarize the contributions as follows:

(1) To improve diversity of generated key phrases in a principled manner during training, the inventors adopt unlikelihood objective under the S2S setting and propose a novel copy token unlikelihood loss.

(2) In order to incentivize model planning, the inventors augment the training objective function to incorporate K-step ahead token prediction. Additionally, the inventors also introduce the K-step ahead UL losses.

(3) The inventors propose new metrics for benchmarking key phrase generation models on diversity criterion. The inventors carry out experiments on datasets from three different domains (scientific articles, news and community QA) and validates the effectiveness of the approach. The inventors observe substantial gains in diversity while maintaining competitive output quality.

APPENDIX

Results on Evaluation-Only Datasets:

TABLE 5

Results of key phrase generation on SEMEVAL, INSPEC and KRAPIVIN datasets.

|  |  | Quality Evaluation | | | | Diversity Evaluation | | | | |
|---|---|---|---|---|---|---|---|---|---|---|
|  |  | | | | | % Duplicate | % Duplicate | Self- | Edit- | Emb- |
|  |  | P@M | R@M | P@M | #KPs | KPs ↓ | Tokens ↓ | BLEU ↓ | Dist ↓ | Sim ↓ |
| SEMEVAL | Ground Truth | — | — | — | →15.1 | 1.6 | 26.6 | 12.7 | 32.6 | 0.152 |
|  | catSeq | 0.321 | 0.105 | 0.158 | 12.1 | 46.2 | 53.8 | 31.9 | 52.3 | 0.415 |
|  | catSeqD | 0.306 | 0.105 | 0.157 | 11.5 | 43.3 | 53.3 | 33.2 | 53.5 | 0.420 |
|  | catSeqCorr | 0.291 | 0.102 | 0.151 | 9.5 | 29.9 | 39.8 | 24.2 | 45.7 | 0.322 |
|  | catSeqTG | 0.325 | 0.099 | 0.152 | 11.8 | 45.2 | 53.5 | 34.0 | 55.5 | 0.450 |
|  | catSeqTG-2RF1 | 0.338 | 0.117 | 0.174 | 7.5 | 32.0 | 41.3 | 29.7 | 46.5 | 0.327 |
|  | DivKGen(UL) | 0.341 | 0.155 | 0.213 | 4.8 | 4.8 | 13.1 | 8.4 | 36.0 | 0.177 |
|  | +K-StepMLE | 0.340 | 0.142 | 0.201 | 4.4 | 4.3 | 14.7 | 10.2 | 37.6 | 0.194 |
|  | +K-StepUL | 0.339 | 0.135 | 0.193 | 4.4 | 4.6 | 10.9 | 6.9 | 35.2 | 0.171 |
| INSPEC | Ground Truth | — | — | — | →9.8 | 0.3 | 15.7 | 7.6 | 33.8 | 0.168 |
|  | catSeq | 0.301 | 0.161 | 0.210 | 10.8 | 39.4 | 49.3 | 29.6 | 50.4 | 0.396 |
|  | catSeqD | 0.289 | 0.146 | 0.194 | 9.5 | 36.1 | 46.4 | 29.5 | 48.6 | 0.376 |
|  | catSeqCorr | 0.281 | 0.153 | 0.198 | 9.8 | 33.6 | 43.7 | 26.4 | 47.0 | 0.351 |
|  | catSeqTG | 0.308 | 0.163 | 0.213 | 11.6 | 41.3 | 51.6 | 31.6 | 51.0 | 0.405 |
|  | catSeqTG-2RF1 | 0.302 | 0.165 | 0.213 | 7.9 | 37.6 | 47.7 | 32.1 | 51.5 | 0.402 |
|  | DivKGen | 0.375 | 0.226 | 0.282 | 5.1 | 6.2 | 13.5 | 11.3 | 33.3 | 0.172 |
|  | +K-StepMLE | 0.366 | 0.207 | 0.264 | 4.8 | 7.5 | 15.7 | 13.6 | 35.9 | 0.194 |
|  | +K-StepUL | 0.360 | 0.200 | 0.257 | 4.9 | 6.8 | 14.0 | 11.5 | 35.7 | 0.176 |
| KRAPIVIN | Ground Truth | — | — | — | →5.7 | 0.1 | 9.8 | 4.6 | 34.6 | 0.174 |
|  | catSeq | 0.289 | 0.247 | 0.266 | 8.4 | 33.5 | 42.5 | 28.3 | 49.8 | 0.381 |
|  | catSeqD | 0.280 | 0.234 | 0.255 | 7.3 | 29.4 | 39.6 | 27.5 | 48.2 | 0.358 |
|  | catSeqCorr | 0.264 | 0.237 | 0.249 | 8.4 | 30.2 | 39.7 | 26.1 | 46.6 | 0.346 |
|  | catSeqTG | 0.267 | 0.235 | 0.250 | 8.2 | 30.2 | 40.3 | 28.0 | 48.3 | 0.362 |
|  | catSeqTG-2RF1 | 0.273 | 0.257 | 0.265 | 7.4 | 32.3 | 42.2 | 29.7 | 47.8 | 0.357 |
|  | DivKGen | 0.244 | 0.237 | 0.240 | 5.8 | 6.7 | 14.2 | 9.2 | 34.0 | 0.182 |
|  | +K-StepMLE | 0.263 | 0.221 | 0.241 | 5.1 | 8.1 | 15.8 | 11.9 | 36.8 | 0.209 |
|  | +K-StepUL | 0.258 | 0.227 | 0.242 | 5.5 | 8.4 | 15.0 | 10.5 | 35.7 | 0.194 |

TABLE 6

Results of key phrase generation on NUS and DUC datasets.

|  |  | Quality Evaluation | | | % Duplicate | Diversity Evaluation | | | | % Duplicate |
|---|---|---|---|---|---|---|---|---|---|---|
|  |  | | | | | % Duplicate | Self- | Edit- | Emb- | |
|  |  | P@M | R@M | P@M | KPs ↓ | Tokens ↓ | BLEU ↓ | Dist ↓ | Sim ↓ | KPs ↓ |
| NUS | Ground Truth | — | — | — | →11.7 | 5.3 | 23.6 | 12.3 | 32.8 | 0.161 |
|  | catSeq | 0.391 | 0.210 | 0.274 | 11.7 | 43.6 | 52.0 | 31.6 | 53.7 | 0.442 |
|  | catSeqD | 0.397 | 0.206 | 0.271 | 10.4 | 41.4 | 49.6 | 32.2 | 52.9 | 0.433 |
|  | catSeqCorr | 0.396 | 0.217 | 0.281 | 10.7 | 38.9 | 47.8 | 29.8 | 50.1 | 0.398 |
|  | catSeqTG | 0.407 | 0.203 | 0.271 | 11.3 | 42.9 | 51.8 | 33.6 | 54.3 | 0.445 |
|  | catSeqTG-2RF1 | 0.385 | 0.228 | 0.286 | 7.6 | 32.6 | 44.1 | 30.0 | 47.4 | 0.355 |
|  | DivKGen(UL) | 0.376 | 0.238 | 0.292 | 5.3 | 6.5 | 15.0 | 10.3 | 34.8 | 0.189 |
|  | +K-StepMLE | 0.394 | 0.225 | 0.287 | 4.8 | 8.6 | 17.7 | 14.1 | 37.7 | 0.218 |
|  | +K-StepUL | 0.393 | 0.218 | 0.281 | 4.4 | 5.9 | 13.5 | 10.0 | 36.6 | 0.202 |
| DUC | Ground Truth | — | — | — | →8.1 | 0.2 | 14.1 | 6.4 | 33.4 | 0.176 |
|  | catSeq | 0.106 | 0.059 | 0.076 | 5.9 | 19.5 | 28.5 | 24.6 | 38.0 | 0.243 |
|  | catSeqD | 0.104 | 0.057 | 0.074 | 6.2 | 20.5 | 29.8 | 24.8 | 38.1 | 0.249 |
|  | catSeqCorr | 0.103 | 0.057 | 0.073 | 5.5 | 15.0 | 24.9 | 20.3 | 36.8 | 0.226 |
|  | catSeqTG | 0.111 | 0.060 | 0.078 | 5.7 | 18.0 | 27.8 | 22.8 | 37.1 | 0.231 |
|  | catSeqTG-2RF1 | 0.115 | 0.069 | 0.086 | 6.2 | 19.4 | 28.9 | 27.1 | 36.2 | 0.217 |
|  | DivKGen | 0.135 | 0.065 | 0.088 | 4.2 | 3.4 | 9.5 | 5.6 | 30.4 | 0.151 |
|  | +K-StepMLE | 0.152 | 0.069 | 0.095 | 4.0 | 3.0 | 9.7 | 5.7 | 30.8 | 0.148 |
|  | +K-StepUL | 0.143 | 0.070 | 0.094 | 4.5 | 3.8 | 9.9 | 6.7 | 29.4 | 0.139 |

TABLE 7

Train/validation/test statistics of the datasets.

|  |  | Quality Evaluation | | | Diversity Evaluation | | | | |
|---|---|---|---|---|---|---|---|---|---|
|  |  | P@M | R@M | P@M | #KPs | % Duplicate KPs ↓ | % Duplicate Tokens ↓ | Self-BLEU ↓ | Edit-Dist ↓ | Emb-Sim ↓ |
| Scientific Articles- KP20K | Ground Truth | — | — | — | →5.3 | 0.1 | 7.3 | 3.8 | 32.7 | 0.159 |
|  | catSeq | 0.291 | 0.26 | 0.274 | 7.3 | 26.6 | 36 | 26.6 | 45.6 | 0.328 |
|  | catSeqD | 0.294 | 0.257 | 0.274 | 6.7 | 25.7 | 35.3 | 27 | 45.3 | 0.325 |
|  | catSeqCorr | 0.283 | 0.264 | 0.273 | 7 | 23.2 | 33.5 | 24.5 | 44 | 0.309 |
|  | catSeqTG | 0.295 | 0.262 | 0.278 | 6.8 | 24.7 | 34.3 | 26.2 | 45.2 | 0.323 |
|  | catSeqTG-2RF1 | 0.274 | 0.286 | 0.28 | 7.5 | 30.9 | 41.7 | 30.7 | 46.7 | 0.341 |
|  | DivKGen(UL) | 0.277 | 0.261 | 0.269 | 5 | 5.3 | 12.6 | 9.7 | 34.4 | 0.181 |
|  | +K-StepMLE | 0.274 | 0.239 | 0.255 | 4.6 | 6.1 | 13.9 | 11.5 | 36.2 | 0.197 |
|  | +K-StepUL | 0.273 | 0.24 | 0.256 | 4.6 | 4.9 | 11.7 | 8.8 | 35.2 | 0.185 |
| News Articles- KPTimes | Ground Truth | — | — | — | →5.0 | 0.1 | 4.9 | 2.2 | 26.5 | 0.135 |
|  | catSeq | 0.399 | 0.375 | 0.387 | 5.9 | 13.7 | 20.7 | 17.2 | 32.7 | 0.202 |
|  | catSeqD | 0.395 | 0.374 | 0.384 | 6.2 | 15.8 | 22.6 | 18.3 | 33.5 | 0.212 |
|  | catSeqCorr | 0.397 | 0.376 | 0.386 | 5.6 | 10.3 | 17.6 | 13.8 | 31.6 | 0.19 |
|  | catSeqTG | 0.402 | 0.38 | 0.391 | 5.9 | 13.8 | 21.2 | 17.6 | 32.8 | 0.203 |
|  | catSeqTG-2RF1 | 0.389 | 0.386 | 0.387 | 6 | 14 | 21 | 18.6 | 32.5 | 0.192 |
|  | DivKGen | 0.385 | 0.32 | 0.35 | 4.3 | 2.3 | 7 | 4.2 | 27.8 | 0.142 |
|  | +K-StepMLE | 0.391 | 0.316 | 0.349 | 4.3 | 3.3 | 7.9 | 5.3 | 27.9 | 0.147 |
|  | +K-StepUL | 0.371 | 0.314 | 0.34 | 4.6 | 3.6 | 8.7 | 5.8 | 28.3 | 0.149 |
| Community QA- StackEx | Ground Truth | — | — | — | →2.7 | 0.3 | 2.9 | 1.5 | 24.2 | 0.167 |
|  | catSeq | 0.526 | 0.518 | 0.522 | 2.7 | 4.3 | 7.4 | 4.1 | 28.2 | 0.226 |
|  | catSeqD | 0.51 | 0.524 | 0.517 | 2.8 | 5 | 8.6 | 4.8 | 28.8 | 0.23 |
|  | catSeqCorr | 0.501 | 0.526 | 0.513 | 2.9 | 5.4 | 9.3 | 5.2 | 29.1 | 0.235 |
|  | catSeqTG | 0.522 | 0.529 | 0.526 | 2.8 | 3.5 | 7 | 3.9 | 27.5 | 0.216 |
|  | catSeqTG-2RF1 | 0.433 | 0.57 | 0.492 | 3.8 | 6.7 | 11.8 | 6.2 | 29 | 0.22 |
|  | DivKGen | 0.512 | 0.453 | 0.481 | 2.2 | 0.3 | 1.4 | 0.5 | 23.3 | 0.175 |
|  | +K-StepMLE | 0.532 | 0.438 | 0.48 | 2 | 0.4 | 1.5 | 0.6 | 23.1 | 0.171 |
|  | +K-StepUL | 0.516 | 0.454 | 0.483 | 2.2 | 0.4 | 1.6 | 0.7 | 23.7 | 0.17 |

*Note that the test set for KPTimes is a combination of 10k records from KPTimes and 10k records from JPTimes (Gallina et al., 2019).

*Note that the test set for KPTimes is a combination of 10 k records from KPTimes and 10 k records from JPTimes (Gallina et al., 2019).

Implementation Details

The inventors use the AllenNLP package (Gardner et al., 2018), which is built on PyTorch framework (Paszke et al., 2019), for implementing the models. The approaches are not limited to this package, and it is used as an example. The inventors provide as input to the model the concatenated title and abstract. Following (Yuan et al., 2020), the ground truth target key phrases are arranged as a sequence, where the absent KPs follow the present KPs. The size of source and target vocabularies are set to 50 k and 10 k respectively. The delimiter token that is inserted in between target key phrases is denoted as <SEP>.

Both the LSTM5 encoder and decoder have a hidden size of 100 d. Word embeddings on both the source and target side are also set to 100 d and randomly initialized. The inventors use the Adam optimizer (Kingma and Ba, 2015) with the default parameters to train the model. The batch size is set to 64 and the inventors incorporate early stopping based on validation F1 score as the criterion.

| Dataset | #Train | #Validation | #Test |
|---|---|---|---|
| KP20K | 530 k | 20 k | 20 k |
| KPTimes* | 260 k | 10 k | 20 k |
| StackEx | 299 k | 16 k | 16 k |
| INSPEC | — | 1500 | 500 |
| SEMEVAL | — | 144 | 100 |
| KRAPIVIN | — | 1844 | 460 |
| NUS | — | — | 211 |
| DUC | — | — | 308 |

The above table sets out the number of instances in each data set, split across training, validation, and test sets.

Regarding the loss term coefficients for UL losses and K-step ahead loss, the inventors set $\lambda_T=15:0$, $\lambda_C=18:0$ and $\gamma_0=1:0$, which are obtained based on performance on validation set after grid search hyperparameter optimization. The hyperparameter tuning is carried out on KP20K dataset and the best values are adopted for other datasets too.

For test time decoding, unlike previous work (Ye and Wang, 2018; Chen et al., 2019a; Yuan et al., 2020), the inventors do not apply exhaustive decoding with large beam sizes, followed by pruning and de-duplication of the output. This is because the model is trained to generate outputs without repetitions.

As such, the inventors do not require any ad-hoc post-processing strategies to improve diversity. Thus, the inventors adopt greedy decoding at test time as well, similar to (Chan et al., 2019). For quality evaluation, the inventors use the evaluation scripts provided by (Chan et al., 2019). Note that Porter Stemming is applied on the outputs for the purpose of quality evaluation.

In Tables 8, 9, and 10, the inventors present qualitative results from the three domains respectively, i.e., scientific articles, news and community QA forums.

Each of Tables 8, 9, and 10 show an input to each model, being the title and the abstract, and the expected output is displayed as the ground truth, and the predicted keywords based on various techniques including the proposed technique DivKGen. In these case study examples, it can be observed that both the MLE and RL baseline tend to generate numerous repetitions in their output sequence. The DivKGen base variant (UL) achieves good diversity, although occasionally it does generate few repetitions. However, the inventors are able to avoid duplicates with the DivKGen (Full) model, which additionally incorporates the K-step ahead losses. The inventors attribute this to be due to the enhanced model planning capabilities that DivKGen (Full) exhibits, by learning what the future tokens should/shouldn't be.

Table 8, below, shows the results of keyword generation based on the title and the abstract, and a ground truth, for the KP20K dataset:

| Dataset: KP20K | |
|---|---|
| Title | automatic image segmentation by dynamic region merging. |
| Abstract | this paper addresses the automatic image segmentation problem in a region merging style. with an initially oversegmented image, in which many regions or superpixels with homogeneous color are detected, an image segmentation is performed by iteratively merging the regions according to a statistical test. there are two essential issues in a region merging algorithm order of merging and the stopping criterion. in the proposed algorithm, these two issues are solved by a novel predicate, which is defined by the sequential probability ratio test and the minimal cost criterion. starting from an oversegmented image, neighboring regions are progressively merged if there is an evidence for merging according to this predicate. we show that the merging order follows the principle of dynamic programming. this formulates the image segmentation as an inference problem, where the final segmentation is established based on the observed image. we also prove that the produced segmentation satisfies certain global properties. in addition, a faster algorithm is developed to accelerate the region merging process, which maintains a nearest neighbor graph in each iteration. experiments on real natural images are conducted to demonstrate the performance of the proposed dynamic region merging algorithm. |
| Ground Truth | image segmentation; region merging; dynamic programming; wald sequential probability ratio test |
| catSeq MLE Baseline | image segmentation; region merging; region merging; dynamic programming; image segmentation |
| catSeqTG-2RF1 (RL) | image segmentation; region merging; dynamic programming; image segmentation; dynamic programming |
| DivKGen (UL) | image segmentation; region merging; region merging; dynamic programming; nearest neighbor graph |
| DivKGen (Full) | image segmentation; dynamic programming; region merging; stopping criterion |

Table 9, below, shows the results of keyword generation based on the title and the abstract, and a ground truth, for the KPTimes dataset:

| Dataset: KPTimes | |
|---|---|
| Title | n.f.l. said to be closer to testing for h.g.h. |
| Abstract | the n.f.l. owners and players have figured out how to divide up their money, and have spent a busy week reconstituting rosters and renewing rivalries, but there is still unfinished business in their labor standoff, and the most important issue remaining could be the question of drug testing. the n.f.l., whose new collective bargaining agreement is expected to be completed and ratified by thursday, could begin blood testing for human growth hormone as soon as september, according to a person briefed on the negotiations who was not authorized to speak publicly, making it the first major north american sports league to conduct such testing on its top players with the union consent. players had long resisted blood testing under the former union president gene upshaw, and negotiators are still determining ways to make the program acceptable to current players. details to be worked out include how many players will be tested for performance enhancing drugs and how they would be randomly selected when drug testing resumes. there was no drug testing of any kind conducted during the lockout. but commissioner roger goodell and demaurice smith, the players union executive director, were said by people briefed on negotiations to have long seen the need for growth hormone testing and to want to cast the n.f.l. as a leader in combating drugs in major sports. they have pointed to the joint actions of upshaw and the former commissioner paul tagliabue, who moved to start the steroid testing program in the late. i think both sides have a commitment to being leaders in this area and to having the best |
| Ground Truth | human growth hormone; goodell roger; national football league; doping sports; football; organized labor; smith demaurice; tests drug use |
| catSeq MLE Baseline | human growth hormone; national football league; football; tests and testing; national football league; tests drug use; tests drug use; national football league; tests drug use; doping sports; tests drug use; national football league; tests drug use |
| catSeqTG-2RF1 (RL) | human growth hormone; baseball; national football league; tests drug use; national football league; football; national football league; lockouts; organized labor |
| DivKGen (UL) | human growth hormone; drug abuse and traffic; national football league; goodell roger; lockouts; national football league |
| DivKGen (Full) | human growth hormone; upshaw gene; goodell roger; national football league; organized labor; lockouts; football |

Table 10, below, shows the results of keyword generation based on the title and the abstract, and a ground truth, for the StackEx dataset:

| Dataset: StackEx | |
|---|---|
| Title | do deep learning algorithms represent ensemble based methods? |
| Abstract | shortly about deep learning for reference ): deep learning is a branch of machine learning based on a set of algorithms that attempt to model high level abstractions in data by using a deep graph with multiple processing layers, composed of multiple linear and non linear transformations. various deep learning architectures such as deep neural networks, convolutional deep neural networks, deep belief networks and recurrent neural networks have been applied to fields like computer vision, automatic speech recognition, natural |

-continued

Dataset: StackEx

| | |
|---|---|
| | language processing, audio recognition and bioinformatics where they have been shown to produce state of the art results on various tasks. my question can deep neural networks or convolutional deep neural networks be viewed as ensemble based method of machine learning or it is different approaches |
| Ground Truth | deep learning; machine learning; neural networks; convolutional neural networks |
| catSeq MLE Baseline | deep learning; machine learning; deep learning |
| catSeqTG-2RF1 (RL) | deep learning; machine learning; neural network; machine learning |
| DivKGen (UL) | deep learning; machine learning; ensemble modeling |
| DivKGen (Full) | deep learning; neural networks |

Figure 6:
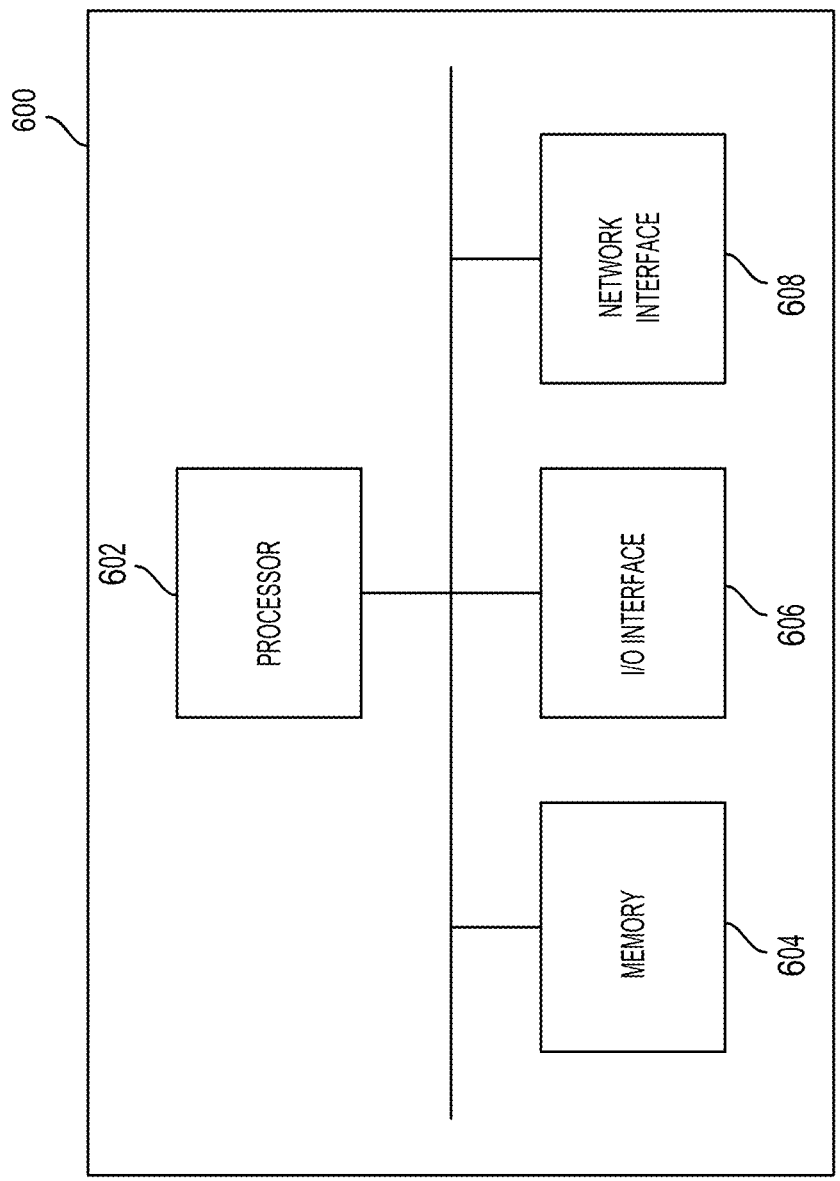
FIG. 6 is a schematic diagram for a computing device, in accordance with an embodiment.

FIG. 6 is a schematic diagram of computing device 600 which may be used to implement system 100, in accordance with an embodiment.

As depicted, computing device 600 includes at least one processor 602, memory 604, at least one I/O interface 606, and at least one network interface 608.

Each processor 602 may be, for example, a microprocessor or microcontroller (e.g., a special-purpose microprocessor or microcontroller), a digital signal processing (DSP) processor, an integrated circuit, a field programmable gate array (FPGA), a reconfigurable processor, a programmable read-only memory (PROM), or combinations thereof.

Memory 604 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 606 enables computing device 600 to interconnect with one or more input devices, such as a keyboard, mouse, camera, touch display and a microphone, or with one or more output devices such as a display and a speaker.

Each network interface 608 enables computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WIMAX), SS6 signaling network, fixed line, local area network, wide area network, and others, or a combination of these.

For simplicity only, one computing device 600 is shown but system 100 may include multiple computing devices 600. The computing devices 600 may be the same or different types of devices. The computing devices 600 may be connected in various ways including directly coupled, indirectly coupled via a network, and distributed over a wide geographic area and connected via a network (which may be referred to as "cloud computing").

For example, and without limitation, a computing device 600 may be a server, network appliance, embedded device, computer expansion module, personal computer, laptop, personal data assistant, cellular telephone, smartphone device, UMPC tablets, video display terminal, gaming console, or other computing devices capable of being configured to carry out the methods described herein.

In some embodiments, each of the encoder 104, decoder 106, generator architecture 110, copy data model architecture 112, and attention mechanism 114 are operated by a single computing device 600 having a separate integrated circuit for each of the said components. A combination of software and hardware implementation of the encoder 104, decoder 106, generator architecture 110, copy data model architecture 112, and attention mechanism 114 is contemplated.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As will be appreciated from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

The foregoing discussion provides many example embodiments of the example subject matter. Although each embodiment represents a single combination of elements, the subject matter is considered to include all possible combinations of the disclosed elements. Thus if one embodiment comprises elements A, B, and C, and a second embodiment comprises elements B and D, then the subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The inventors note that the described embodiments and examples are illustrative and non-limiting. Practical implementation of the features may incorporate a combination of some or all of the aspects, and features described herein should not be taken as indications of future or existing product plans. The inventors partake in both foundational and applied research, and in some cases, the features described are developed on an exploratory basis.

REFERENCES

Dzmitry Bahdanau, Kyunghyun Cho, and Yoshua Bengio. 2015. Neural machine translation by jointly learning to align and translate. In Yoshua Bengio and Yann LeCun, editors, *3rd International Conference on Learning Representations, ICLR 2015*, San Diego, CA, USA, May 7-9, 2015, *Conference Track Proceedings*.

Hareesh Bahuleyan, Lili Mou, Olga Vechtomova, and Pascal Poupart. 2018. Variational attention for sequence-to-sequence models. In *Proceedings of the 27th International Conference on Computational Linguistics*, pages 1672-1682, Santa Fe, New Mexico, USA, August. Association for Computational Linguistics.

Kamil Bennani-Smires, Claudiu Musat, Andreea Hossmann, Michael Baeriswyl, and Martin Jaggi. 2018. Simple unsupervised key phrase extraction using sentence embeddings. In *Proceedings of the 22nd Conference on Computational Natural Language Learning*, pages 221-229, Brussels, Belgium, October. Association for Computational Linguistics.

Adrien Bougouin, Florian Boudin, and Béatrice Daille. 2013. Topicrank: Graph-based topic ranking for keyphrase extraction. In *International Joint Conference on Natural Language Processing (IJCNLP)*, pages 543-551.

Hou Pong Chan, Wang Chen, Lu Wang, and Irwin King. 2019. Neural keyphrase generation via reinforcement learning with adaptive rewards. In Proceedings of the *57th Annual Meeting of the Association for Computational Linguistics*, pages 2163-2174, Florence, Italy, July. Association for Computational Linguistics.

Angela Fan, Mike Lewis, and Yann Dauphin. 2018. Hierarchical neural story generation. In *Proceedings of the 56th Annual Meeting of the Association for Computational Linguistics (Volume 1: Long Papers)*, pages 889-898, Melbourne, Australia, July. Association for Computational Linguistics.

Ygor Gallina, Florian Boudin, and Beatrice Daille. 2019. KPTimes: A large-scale dataset for keyphrase generation on news documents. In *Proceedings of the 12th International Conference on Natural Language Generation*, pages 130-135, Tokyo, Japan, October-November. Association for Computational Linguistics.

Xiang Gao, Sungjin Lee, Yizhe Zhang, Chris Brockett, Michel Galley, Jianfeng Gao, and Bill Dolan. 2019. Jointly optimizing diversity and relevance in neural response generation. In *Proceedings of the 2019 Conference of the North American Chapter of the Association for Computational Linguistics: Human Language Technologies, Volume 1 (Long and Short Papers)*, pages 1229-1238, Minneapolis, Minnesota, June. Association for Computational Linguistics.

Jiatao Gu, Zhengdong Lu, Hang Li, and Victor O. K. Li. 2016. Incorporating copying mechanism in sequence-to-sequence learning. In *Proceedings of the 54th Annual Meeting of the Association for Computational Linguistics (Volume 1: Long Papers)*, pages 1631-1640, Berlin, Germany, August. Association for Computational Linguistics.

Khaled M Hammouda, Diego N Matute, and Mohamed S Kamel. 2005. Corephrase: Keyphrase extraction for document clustering. In *International workshop on machine learning and data mining in pattern recognition*, pages 265-274. Springer.

Sepp Hochreiter and Jürgen Schmidhuber. 1997. Long short-term memory. *Neural computation*, 9(8):1735-1780.

Ari Holtzman, Jan Buys, Li Du, Maxwell Forbes, and Yejin Choi. 2020. The curious case of neural text degeneration. In 8*th International Conference on Learning Representations, ICLR 2020, Addis Ababa, Ethiopia*, Apr. 26-30, 2020. OpenReview.net.

Shaojie Jiang, Thomas Wolf, Christof Monz, and Maarten de Rijke. 2020. TLDR: token loss dynamic reweighting for reducing repetitive utterance generation. *CoRR, abs/2003.11963*.

Feifan Liu, Deana Pennell, Fei Liu, and Yang Liu. 2009. Unsupervised approaches for automatic keyword extraction using meeting transcripts. In *Proceedings of Human Language Technologies: The 2009 Annual Conference of the North American Chapter of the Association for Computational Linguistics*, pages 620-628, Boulder, Colorado, June. Association for Computational Linguistics.

Jiwei Li, Michel Galley, Chris Brockett, Jianfeng Gao, and Bill Dolan. 2016. A diversity-promoting objective function for neural conversation models. In *Proceedings of the 2016 Conference of the North American Chapter of the Association for Computational Linguistics: Human Language Technologies*, pages 110-119, San Diego, California, June. Association for Computational Linguistics.

Rui Meng, Sanqiang Zhao, Shuguang Han, Daqing He, Peter Brusilovsky, and Yu Chi. 2017. Deep keyphrase generation. In *Proceedings of the 55th Annual Meeting of the Association for Computational Linguistics (Volume 1: Long Papers)*, pages 582-592, Vancouver, Canada, July. Association for Computational Linguistics.

Rada Mihalcea and Paul Tarau. 2004. TextRank: Bringing order into text. In *Proceedings of the 2004 Conference on Empirical Methods in Natural Language Processing*, pages 404-411, Barcelona, Spain, July. Association for Computational Linguistics.

Thuy Dung Nguyen and Min-Yen Kan. 2007. Keyphrase extraction in scientific publications. In *International conference on Asian digital libraries*, pages 317-326. Springer.

Tong Niu and Mohit Bansal. 2020. Avgout: A simple output-probability measure to eliminate dull responses. In *The Thirty-Fourth AAAI Conference on Artificial Intelligence, AAAI 2020, The Thirty-Second Innovative Applications of Artificial Intelligence Conference, IAAI 2020, The Tenth AAAI Symposium on Educational Advances in Artificial Intelligence, EAAI 2020*, New York, NY, USA, Feb. 7-12, 2020, pages 8560-8567. AAAI Press.

Matteo Pagliardini, Prakhar Gupta, and Martin Jaggi. 2018. Unsupervised learning of sentence embeddings using compositional n-gram features. In *Proceedings of the 2018 Conference of the North American Chapter of the Association for Computational Linguistics: Human Language Technologies, Volume 1 (Long Papers)*, pages 528-540, New Orleans, Louisiana, June. Association for Computational Linguistics.

Kishore Papineni, Salim Roukos, Todd Ward, and Wei-Jing Zhu. 2002. Bleu: a method for automatic evaluation of machine translation. In *Proceedings of the 40th annual meeting on association for computational linguistics*, pages 311-318. Association for Computational Linguistics.

Ilya Sutskever, Oriol Vinyals, and Quoc V Le. 2014. Sequence to sequence learning with neural networks. In *Advances in neuralinformation processing systems*, pages 3104-3112.

Ashwin K. Vijayakumar, Michael Cogswell, Ramprasaath R. Selvaraju, Qing Sun, Stefan Lee, David J. Crandall, and Dhruv Batra. 2018. Diverse beam search for improved description of complex scenes. In Sheila A. McIlraith and Kilian Q. Weinberger, editors, *Proceedings of the Thirty-Second AAAI Conference on Artificial Intelligence, (AAAI-18), the 30th innovative Applications of Artificial Intelligence (IAAI-18), and the 8th AAAI Symposium on Educational Advances in Artificial Intelligence (EAAI-18)*, New Orleans, Louisiana, USA, Feb. 2-7, 2018, pages 7371-7379. AAAI Press.

Sean Welleck, Ilia Kulikov, Stephen Roller, Emily Dinan, Kyunghyun Cho, and Jason Weston. 2020. Neural text generation with unlikelihood training. In *International Conference on Learning Representations*.

Hai Ye and Lu Wang. 2018. Semi-supervised learning for neural keyphrase generation. In Proceedings of the 2018 *Conference on Empirical Methods in Natural Language Processing*, pages 4142-4153, Brussels, Belgium, October-November. Association for Computational Linguistics.

Xingdi Yuan, Tong Wang, Rui Meng, Khushboo Thaker, Peter Brusilovsky, Daqing He, and Adam Trischler. 2020. One size does not fit all: Generating and evaluating variable number of keyphrases. In *Proceedings of the 58th Annual Meeting of the Association for Computational Linguistics*, Seattle, USA. Association for Computational Linguistics.

Yaoming Zhu, Sidi Lu, Lei Zheng, Jiaxian Guo, Weinan Zhang, Jun Wang, and Yong Yu. 2018. Texygen: A benchmarking platform for text generation models. In *The 41st International ACM SIGIR Conference on Research & Development in Information Retrieval*, pages 1097-1100.

What is claimed is:

1. A system for training a sequence to sequence (S2S) machine learning model for predicting keywords, the system comprising:
   at least one computer memory having stored thereon the S2S machine learning model, the S2S machine learning model comprising a plurality of parameters representative of a decoder, the decoder including a generation data model architecture and a copy data model architecture;
   at least one processor, in communication with the at least one computer memory, configured to:
      receive a first data set comprising a plurality of source token sets and related ground truth token sets;
      extract a second data set of target vocabulary tokens from the first data set comprising a subset of source tokens and related ground truth tokens of the first data set;
      train the S2S machine learning model for predicting keywords by, for each source token in a first source token set:
         processing, with the decoder, a first source token set encoder representation and a respective source token encoder representation to generate a predicted keyword, wherein processing with the decoder comprises:
            processing the first source token set encoder representation and a previous ground truth token embedding to generate a hidden state;
            generating a first set keyword probability distribution of the copy data model architecture based on normalizing, over the source tokens in the first source token set, an attention mechanism interrelation value between the respective source token encoder representation and the hidden state;
            generating a second set keyword probability distribution of the generation data model architecture based on normalizing, over the target vocabulary tokens, the attention mechanism interrelation value;
            determining a probability of generating a keyword from the second data set based on a vocabulary token parameter processing the hidden state, a related ground truth token, and the vocabulary normalized attention mechanism interrelation value;
            generating a probability of generating the keyword from the first source token set based on the probability of generating the keyword from the second data set; and
            generating a predicted keyword based on applying the probability of generating the keyword from the second data set to the second set keyword probability distribution and applying the probability of generating the keyword from the first token source set to the first set keyword probability distribution;
         updating the plurality of parameters by:
            determining a generation loss based on comparing the predicted keyword to a first exclusion list of ground truth tokens;
            determining a copy loss based on comparing the predicted keyword to a second exclusion list of source tokens and ground truth tokens; and
            adjusting the plurality of parameters based on the copy loss, the generation loss, and a comparison of the predicted keyword and a respective predicted keyword ground truth token to penalize the decoder for generating repetitive keywords; and
      store the trained S2S machine learning model for predicting keywords in the at least one computer memory.

2. The system of claim 1, wherein the decoder further includes a plurality of parameters representative of a future sequence predictor, and the computer is configured to:
   process, with the future sequence predictor the respective predicted keyword ground truth token, a second source token of the first token set, and the first source token set encoder representation to generate a future predicted keyword;
   and wherein updating the plurality of parameters further includes:
      updating the first exclusion list with the respective predicted keyword ground truth token;
      updating the second exclusion list with the respective predicted keyword ground truth token and the first source token associated with the respective predicted keyword ground truth token;
      determining a future generation loss based on comparing the predicted future keyword to the first exclusion list of ground truth tokens;
      determining a future copy loss based on comparing the predicted future keyword to the second exclusion list of source tokens and ground truth tokens; and adjusting the plurality of parameters based on the future copy loss, the future generation loss, and a comparison of the predicted future keyword and a respective predicted future keyword ground truth token to penalize the decoder for generating repetitive keywords.

3. The system of claim 2, wherein the processor is configured to process, with the future sequence predictor the respective predicted keyword ground truth token, a second source token of the first token set, and the first source token set encoder representation to generate a future predicted keyword by:

generating a first set future keyword probability distribution of the copy mechanism based on normalizing, over the source tokens in the first source token set, a second attention mechanism interrelation value between an encoder representation of a second source token of the source token set and the hidden state;

generating a second set future keyword probability distribution of the generation data model architecture based on normalizing, over the target vocabulary tokens, the second attention mechanism interrelation value;

determining a probability of generating a future keyword from the second data set based on the vocabulary token parameter processing the hidden state, the respective predicted keyword ground truth token, and the vocabulary normalized second attention mechanism interrelation value; and generating the predicted future keyword based on applying the probability of generating the future keyword from the second data set to the second set future keyword probability distribution and applying the probability of generating the future keyword from the first token source set to the first set future keyword probability distribution.

4. The system of claim 2, wherein the processor is further configured to train the model by:

determining a second predicted future keyword by processing a third source token and third truth token with the future sequence predictor;

and wherein updating the plurality of parameters further includes:

updating the first exclusion list with the respective predicted future keyword ground truth token;

updating the second exclusion list with the respective predicted future keyword ground truth token and a second source token associated with the respective predicted future keyword ground truth token;

determining a second future copy loss based on comparing the second predicted future keyword to second exclusion list of source tokens and ground truth tokens;

determining a second future generation loss based on comparing the predicted future keyword to the first exclusion list of ground truth tokens and source tokens; and adjusting the plurality of parameters based on a decayed value of the second future copy loss, the second future generation loss, and a comparison of the second predicted future keyword and a respective second predicted future keyword ground truth token to penalize the decoder for generating repetitive keywords.

5. The system of claim 2, wherein the processor is configured to:

generate, by processing a plurality of sequential source tokens of the first token set and a respective plurality of sequential ground truth tokens with the future sequence predictor, a plurality of future predicted keywords, and wherein updating the plurality of parameters based further includes:

updating the first exclusion list with the processed plurality of sequential source tokens of the first token set and the respective the processed plurality of sequential ground truth tokens;

updating, the second exclusion list with the processed plurality of sequential source tokens of the first token set;

determining a future generation loss based on comparing the plurality of future predicted keywords to the first exclusion list of ground truth tokens and source tokens;

determining a future copy loss based on comparing the plurality of future predicted keywords to the second exclusion list of source tokens and ground truth tokens; and adjusting the plurality of parameters based on a decay rate and the future copy loss, the future generation loss, and a comparison of the plurality of future predicted keywords and respective plurality of sequential ground truth tokens to penalize the decoder for generating repetitive keywords.

6. The system of claim 5, wherein the decay rate is adapted to linearly increase with successive future predicted keywords.

7. The system of claim 1, wherein the first exclusion list comprises one or more ground truth tokens and one or more source tokens associated with the one or more ground truth tokens and the one or more source tokens previously processed by the decoder.

8. The system of claim 1, wherein the second exclusion list comprises one or more source tokens associated with the one or more source tokens previously processed by the decoder.

9. The system of claim 1, wherein the first exclusion list or the second exclusion list are dynamically updated.

10. A system for training a sequence to sequence (S2S) machine learning model for predicting keywords, the system comprising:

at least one computer memory having stored thereon the S2S machine learning model, the S2S machine learning model comprising a plurality of parameters representative of a decoder, the decoder including a generation data model architecture and a copy data model architecture; at least one processor, in communication with the at least one computer memory, configured to:

receive a first data set comprising a plurality of source token sets, and related ground truth token sets;

extract a second data set of target vocabulary tokens from the first data set comprising a subset of source tokens and ground truth tokens of the first data set;

train the S2S machine learning model for predicting keywords by, for each source token in a first source token set:

generating a predicted keyword based on a first source token set keyword probability distribution of the copy data model architecture associated with a probability of generating the keyword from the first source token set, based on the respective source token, and a second set keyword probability distribution of the generation data model architecture, based on the respective source token, and associated with the probability of generating the keyword from the second data set;

updating the plurality of parameters by:

determining a generation loss based on comparing the predicted keyword to a first exclusion list of ground truth tokens;

determining a copy loss based on comparing the predicted keyword to a second exclusion list of source tokens and ground truth tokens; and adjusting the plurality of parameters based on the copy loss, the generation loss, and a comparison of the predicted keyword and a respective predicted keyword ground truth token to penalize the decoder for generating repetitive keywords; and store the trained S2S machine learning model in the at least one computer memory.

11. The system of claim 10, wherein the processor is further configured to:

generate a plurality of sequential predicted keywords based on the first source token set keyword probability distribution of the copy data model architecture associated with a probability of generating the keyword from the first source token set, based on a respective plurality of sequential source tokens of the first data set, and a second set keyword probability distribution of the generation data model architecture, based on the respective plurality of sequential source tokens of the first data set, and associated with the probability of generating the keyword from the second data set;

update the plurality of parameters by, sequentially, for each ground truth token associated with the respective plurality of sequential source tokens of the first data set:

determining the generation loss based on comparing the respective ground truth token to the first exclusion list of ground truth tokens;

determining the copy loss based on comparing the predicted keyword to a second exclusion list of source tokens and ground truth tokens; and adjusting the plurality of parameters based on the copy loss, the generation loss, and a comparison of the predicted keyword and a respective predicted keyword ground truth token to penalize the decoder for generating repetitive keywords.

12. The system of claim 10, wherein sequential copy losses, generation losses, and comparisons of the predicted keyword and the respective predicted keyword ground truth token losses are reduced by a decay rate.

13. The system of claim 10, wherein the first exclusion list comprises one or more ground truth tokens and one or more source tokens associated with the one or more ground truth tokens and the one or more source tokens previously processed by the decoder.

14. The system of claim 10, wherein the second exclusion list comprises one or more source tokens associated with the one or more source tokens previously processed by the decoder.

15. A method for training a sequence to sequence (S2S) machine learning model for predicting keywords, the S2S machine learning model comprising a plurality of parameters representative of a decoder, the decoder including a generation data model architecture and a copy data model architecture; the method comprising:

receiving a first data set comprising a plurality of source token sets, and related ground truth token sets;

extracting a second data set of target vocabulary tokens from the first data set comprising a subset of source tokens and ground truth tokens of the first data set;

training the S2S machine learning model by, for each source token in a first source token set:

generating a predicted keyword based on a first source token set keyword probability distribution of the copy data model architecture associated with a probability of generating the keyword from the first source token set, based on the respective source token, and a second set keyword probability distribution of the generation data model architecture, based on the respective source token, and associated with the probability of generating the keyword from the second data set;

updating the plurality of parameters by:

determining a generation loss based on comparing the predicted keyword to a first exclusion list of ground truth tokens;

determining a copy loss based on comparing the predicted keyword to a second exclusion list of source tokens and ground truth tokens; and adjusting the plurality of parameters based on the copy loss, the generation loss, and a comparison of the predicted keyword and a respective predicted keyword ground truth token to penalize the decoder for generating repetitive keywords; and storing the trained S2S machine learning model.

16. The method of claim 15, further comprising:

generating a plurality of sequential predicted keywords based on the first source token set keyword probability distribution of the copy data model architecture associated with a probability of generating the keyword from the first source token set, based on a respective plurality of sequential source tokens of the first data set, and a second set keyword probability distribution of the generation data model architecture, based on the respective plurality of sequential source tokens of the first data set, and associated with the probability of generating the keyword from the second data set;

updating the plurality of parameters by, sequentially, for each ground truth token associated with the respective plurality of sequential source tokens of the first data set:

determining the generation loss based on comparing the respective ground truth token to the first exclusion list of ground truth tokens;

determining the copy loss based on comparing the predicted keyword to a second exclusion list of source tokens and ground truth tokens; and adjusting the plurality of parameters based on the copy loss, the generation loss, and a comparison of the predicted keyword and a respective predicted keyword ground truth token to penalize the decoder for generating repetitive keywords.

17. The method of claim 15, wherein sequential copy losses, generation losses, and comparisons of the predicted keyword and the respective predicted keyword ground truth token losses are reduced by a decay rate.

18. The method of claim 15, wherein the first exclusion list comprises one or more ground truth tokens and one or more source tokens associated with the one or more ground truth tokens and the one or more source tokens previously processed by the decoder.

19. The method of claim 15, wherein the second exclusion list comprises one or more source tokens associated with the one or more source tokens previously processed by the decoder.

20. A non-transitory computer readable storage medium having stored therein computer executable program code, which when execited by the processor, cases the processor to:
> receive a first data set comprising a plurality of source token sets, and related ground truth token sets;
> extract a second data set of target vocabulary tokens from the first data set comprising a subset of source tokens and ground truth tokens of the first data set;
> train an S2S machine learning model for predicting keywords, the S2S machine learning model comprising a plurality of parameters representative of a decoder, the decoder including a generation data model architecture and a copy data model architecture: by, for each source token in a first source token set:
>> generating a predicted keyword based on a first source token set keyword probability distribution of the copy data model architecture associated with a probability of generating the keyword from the first source token set, based on the respective source token, and a second set keyword probability distribution of the generation data model architecture, based on the respective source token, and associated with the probability of generating the keyword from the second data set;
> updating the plurality of parameters by:
>> determining a generation loss based on comparing the predicted keyword to a first exclusion list of ground truth tokens;
>> determining a copy loss based on comparing the predicted keyword to a second exclusion list of source tokens and ground truth tokens;
>> adjusting the plurality of parameters based on the copy loss, the generation loss, and a comparison of the predicted keyword and a respective predicted keyword ground truth token to penalize the decoder for generating repetitive keywords; and
> store the trained S2S machine learning model in at least one computer memory.

* * * * *